US012669943B2

(12) United States Patent
Kumar et al.

(10) Patent No.: US 12,669,943 B2
(45) Date of Patent: Jun. 30, 2026

(54) VOLATILE MEMORY DATA RECOVERY BASED ON INDEPENDENT PROCESSING UNIT DATA ACCESS

(71) Applicant: Intel Corporation, Santa Clara, CA (US)

(72) Inventors: Karthik Kumar, Chandler, AZ (US); Francesc Guim Bernat, Barcelona (ES); Alexander Bachmutsky, Sunnyvale, CA (US); Susanne M. Balle, Hudson, NH (US); Andrzej Kuriata, Gdansk (PL); Nagabhushan Chitlur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/952,835

(22) Filed: Sep. 26, 2022

(65) Prior Publication Data
US 2023/0023229 A1      Jan. 26, 2023

(51) Int. Cl.
G06F 12/00        (2006.01)
G06F 3/06         (2006.01)

(52) U.S. Cl.
CPC .......... G06F 3/0619 (2013.01); G06F 3/0647 (2013.01); G06F 3/0673 (2013.01)

(58) Field of Classification Search
None
See application file for complete search history.

(56) References Cited

U.S. PATENT DOCUMENTS

| | | | |
|---|---|---|---|
| 10,778,597 B1 * | 9/2020 | Tan | H04L 67/02 |
| 12,278,763 B2 | 4/2025 | Vegesna et al. | |
| 2023/0023229 A1 | 1/2023 | Kumar et al. | |
| 2024/0069742 A1 * | 2/2024 | McGee | G06F 3/0647 |
| 2024/0362099 A1 | 10/2024 | Bower, III et al. | |
| 2024/0364582 A1 | 10/2024 | Perks et al. | |

OTHER PUBLICATIONS

Kennedy, P. (Jun. 14, 2021). Intel IPU is an exotic answer to the industry DPU. Serve TheHome. https://www.servethehome.com/intel-ipu-exotic-answer-to-industry-dpu/ (Year: 2021).*
Radhakrishnan, Sabareesan, "High Availability and Disaster Recovery Options for SAP HANA on AWS", Amazon Web Services—HA/DR Options for SAP HANA on AWS, Nov. 2015, 23 pages.

* cited by examiner

*Primary Examiner* — Daniel D Tsui
(74) *Attorney, Agent, or Firm* — Compass IP Law PC

(57) ABSTRACT

In a server system, a host computing platform can have a processing unit separate from the host processor to detect and respond to failure of the host processor. The host computing platform includes a memory to store data for the host processor. The processing unit has an interface to the host processor and the memory and an interface to a network external to the host processor and has access to the memory. In response to detection of failure of the host processor, the processing unit migrates data from the memory to another memory or storage.

22 Claims, 10 Drawing Sheets

VOLATILE MEMORY DATA RECOVERY BASED ON INDEPENDENT PROCESSING UNIT DATA ACCESS

FIELD

Descriptions are generally related to network computing, and more particular descriptions are related to data migration.

BACKGROUND

There continues to be an increase in server system deployments. Server systems involve many server devices connected together to share workloads. Server systems make up what is generally referred to as "the cloud", where racks of server devices, memory resources, and storage devices represent hardware that can be shared by different entities to perform computational workloads.

The capability of server systems is maximized when all hardware resources are operational together. Server downtime refers to a condition when a server device or machine experiences a failure and is no longer functional. In enterprise domains and cloud computing domains, server downtime can be a very expensive disruption, as it impacts business continuity.

Reasons for server downtime can include hardware errors with the central processing unit (CPU), issues with upgrades/patches that result in a server node being unable to boot, fatal errors in on-device memory, or other reasons. The possibility of such conditions can result in loss of data from enterprise applications that were operating on data that is in cache or system memory that has not been backed up to persistent storage. For example, if an application recently updated a table or performed a lengthy computation, and a failure occurs prior to propagating the table changes or computation results to disk, the data is lost. Other intermediate data can include access statistics, histograms, or other data that an application builds and maintains on its data for algorithmic reasons.

Failure in a server system resulting in the loss of available computational capability can be disruptive and have losses in terms of opportunity costs. However, the loss of the data can have a more significant cost as the loss of data can result in the loss of significant computational effort, which would then need to be repeated.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
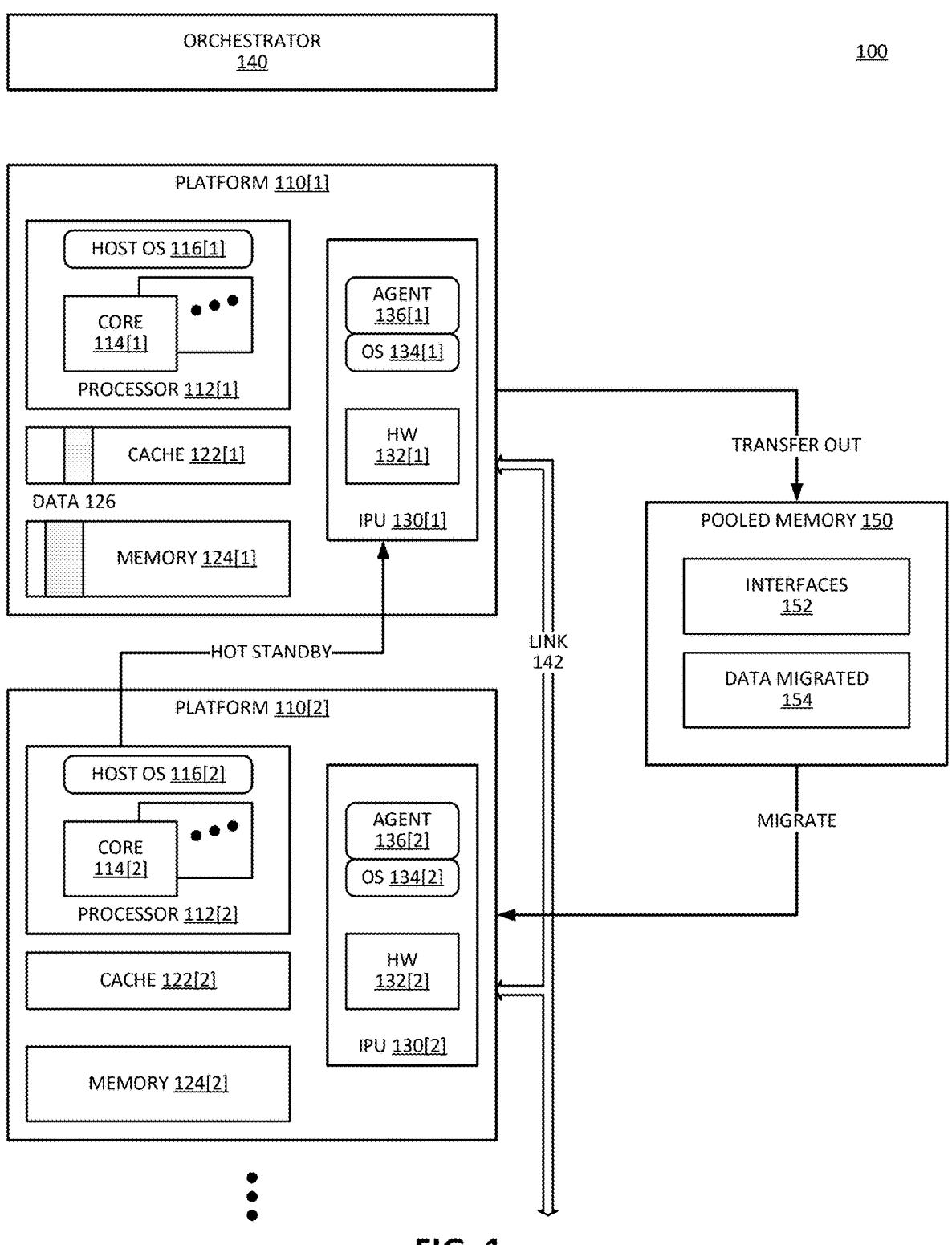
FIG. 1 is a block diagram of an example of a system in which failure in one platform can result in migration of volatile data to another platform.

Descriptions of certain details and implementations follow, including non-limiting descriptions of the figures, which may depict some or all examples, and well as other potential implementations.

DETAILED DESCRIPTION

As described herein, a server system has multiple server nodes each representing a host computing platform. The host computing platform can have a processing unit separate from the host processor to detect and respond to failure of the host processor. The processing unit can be an infrastructure processing unit (IPU), data processing unit (DPU), a smart network interface circuit (NIC), or other processing unit to which the host processor(s) offload tasks. The tasks can include data management and preprocessing or interconnection services for the server node. The processing unit includes an interface to the host, including the host processor and host memory, and an interface to a network external to the host. The processing unit has a different computational domain from the host processor, and can thus operate independently of failure of the host processor.

The host computing platform includes a volatile memory that stores data for the host processor. A volatile memory refers to system memory or cache or other memory whose state is indeterminate when power is interrupted to the device or when the data is not refreshed for longer than a threshold period. The data can include updates to data structures such as tables or databases; the results of lengthy computations; statistics, histograms, or other data that an application builds and maintains for algorithmic uses; artificial intelligence (artificial intelligence) or deep learning (DL) model information or AI/DL computations; or other data, or a combination. Such data can be referred to as "critical" data in that loss of the data would require significant time or other resources to reconstruct, or data that may not be capable of reliable reconstruction.

The processing unit monitors the operation of the host processor to detect failure or to predict failure of the host processor (e.g., a hardware failure or a server failure). Failure detection in the following descriptions can refer to detection of a condition that is likely to result in a failure (e.g., failure prediction through detection of anticipated failure conditions) or detection of the occurrence of a failure. The occurrence of a failure refers more specifically to a failure that has already taken place, rather than forecasting a failure. Thus, the failure detection can be reactive detection by detecting a failure condition that has already occurred, or failure detection can be proactive by detecting conditions expected to result in a failure in the near future.

The processing unit has access to the volatile memory. In response to failure detection, the processing unit and has access to the volatile memory. In response to detection of failure of the host processor, the processing unit migrates data from the volatile memory to another memory or storage. The migration can be to a persistent memory or nonvolatile storage on the server node or on an external node. Persistent or nonvolatile memory or storage refers to data storage that maintains state even if power is interrupted, without the need for data refresh.

The persistent memory can be storage on another platform or another server node. The other platform can be a pooled storage or pooled volatile memory resource. The other platform can be another server node or computational platform. The persistent memory can be storage local to the IPU. In one example, the system can initiate instances of the applications or services associated with the data on one or more other server nodes. Thus, the system can migrate the data and migrate the services associated with the migrated data. As described herein, the system can leverage the IPU or other processing unit to preserve critical data in the event of failure in a host node, thus mitigating hardware failures in a server system.

FIG. 1 is a block diagram of an example of a system in which failure in one platform can result in migration of volatile data to another platform. System 100 represents a multi-server system. Platform 110[1], platform 110[2], . . . , collectively platforms 110, represent the multiple servers in system 100. Platforms 110 can be referred to as the multiple computing platforms of system 100. Orchestrator 140 manages workflow distribution among platforms 110. In one example, orchestrator 140 can manage runtime status and configuration of platforms 110.

Platform 110[1], platform 110[2], . . . , have processor 112[1], processor 112[2], . . . , respectively, collectively processors 112. Processors 112 each include one or more cores 114[1], cores 114[2], . . . , respectively, collectively cores 114, which execute processes for each respective platform. In one example, each processor represents a separate central processing unit (CPU). In one example, a server device includes multiple CPUs. Thus, in one example, each platform 110 represents a separate server. Each of platforms 110 represents a node in the server environment. In one example, each processor represents a separate graphics processing unit (GPU).

Processor 112[1], processor 112[2], . . . , execute host operating system (OS) 116[1], host OS 116[2], . . . , collectively host OSes 116. The host OS for each platform manages the operations for each platform. Platform 110[1], platform 110[2], . . . , have cache 122[1], cache 122[2], . . , respectively, collectively caches 122, and memory 124[1], memory 124[2], . . . , respectively, collectively memory 124.

Caches 122 are cache devices with volatile memory. In one example, memory 124 represents a volatile memory. In one example, memory 124 includes volatile memory and nonvolatile memory. In one example, memory 124 represents a multitier memory or multilevel memory. A multitier memory includes a hierarchy of memory devices. A multitier memory hierarchy includes memory devices of different types that share address space but have differing access times, where memory devices with faster access times mitigate the delay of the memory devices with slower access times.

In one example, each platform 110 includes a processing unit to offload certain processing tasks or network management tasks. In system 100, platform 110[1], platform 110[2], . . . , have infrastructure processing unit (IPU, which could alternatively be referred to as an intelligent processing unit) 130[1], IPU 130[2], . . . , respectively, collectively IPUs 130. Alternatively, one or more of IPUs 130 can be replaced by a data processing unit (DPU) or other processing unit or smart NIC. Processors 112 can offload tasks (e.g., processing tasks) to IPUs 130, such as a networking, storage, accessing shared memory or storage, preparing data for use by processors 112, or other tasks.

IPU 130[1], IPU[2], . . . , include hardware (HW) 132[1], HW 132[2], . . . , respectively, collectively hardware 132. Hardware 132 can represent processors or cores or other hardware to perform the operations of the IPU. Hardware 132 can include storage, local memory resources, clocking hardware, interface hardware, or other hardware. The local memory can enable the operation of the IPU processors. The storage enables the IPU to store data locally. The clocking hardware enables IPUs 130 to perform operations and communication over the interface hardware. In one example, IPUs 130 connect with processors 112 and processing cores 114 through a peripheral component interconnect express (PCIe) interface or PCIe link.

Hardware 132[1], hardware 132[2], . . . , execute operating system (OS) 134[1], OS 134[2], . . . , respectively, collectively OSes 134. OSes 134 are separate from host OSes 116. The separation of OSes 134 from OSes 116 allows IPUs 130 to operate independently from the other hardware of platforms 110. As such, IPUs 130 are in different computational domains from their respective platforms 110. Thus, each server node includes two computational domains: the domain of the primary processor 112 or CPU, and the domain of the IPU associated with the node.

Processors 112 can access caches 122 and memory 124. IPUs 130 can also access caches 122 and memory 124. The ability of IPUs 130 to access caches 122 and memory 124 enables the IPUs to access the volatile memory of the platforms even if there is a hardware failure of the other hardware of the platforms. In one example, IPU 130[1], IPU 130[2], . . . , have agent 136[1], agent 136[2], . . . , respectively, collectively agents 136. Agents 136 represent software logic on the IPUs to monitor the health of the platform hardware.

Agents 136 enable IPUs 130 to respond to hardware failure of respective platforms 110. In one example, agents 136 monitor one or more performance metrics of respective platforms 110. Based on the performance metrics, the agents can determine if there is a hardware failure on their platform. In one example, the determination is a prediction of hardware failure. With a prediction, the agent can determine that a hardware failure is imminent. Thus, the prediction can be made prior to an actual failure of the hardware. Alternatively, the determination can be made in response to detection of a hardware failure, after a failure has occurred.

In one example, agents 136 can determine a hardware failure or a failure of the CPU based on logs processing. In one example, agents 136 can determine a hardware failure or a failure of the CPU based on baseboard management controller (BMC) monitoring. In one example, agents 136 can determine a hardware failure or a failure of the CPU based on OS monitoring.

In one example, system 100 includes link 142 between platforms 110. In one example, link 142 also connects to orchestrator 140. Link 142 can represent a common communication link shared by platforms 110, or individual links between separate platforms. Link 142 allows the different platforms to communicate with each other, to pass information from one platform to another. Platform 110[1] can connect with platform 110[2] via link 142.

In one example, system 100 has pooled memory 150. Pooled memory 150 represents shared memory resources shared among platforms 110, and can be a pooled memory platform in system 100. In one example, pooled memory 150 represents volatile memory shared among platforms 110. In one example, pooled memory 150 represents nonvolatile or persistent memory shared among platforms 110. A pooled memory with persistent memory can be referred to as a remote storage platform relative to platforms 110. In one example, pooled memory 150 represents volatile memory and nonvolatile/persistent memory shared among platforms 110.

Pooled memory 150 can include interfaces 152 to enable the memory to interface with platforms 110. Interfaces 152 can be or include a compute express link (CXL) link, peripheral component interconnect express (PCIe) link, or other link. Data migrated 154 represents data migrated to or stored in pooled memory 150 from platforms 110. In one example, data migrated 154 represents data sent between platforms in response to a failure of one of the platforms. Thus, data migrated 154 can represent failover data.

System 100 illustrates data 126 in platform 110[1]. Data 126 can include the gray area of cache 122[1] and the gray area of memory 124[1], which are both regions of volatile memory in platform 110[1]. Thus, failure of the CPU can result in loss of data 126. In one example, data 126 is a specifically identified region of memory for processor 112. Instead of protecting all volatile memory, system 100 can enable each CPU or each node identify critical volatile memory to protect in the event of hardware failure. The critical data can be or include cryptographic keys, results on computations (e.g., computational results), workload state, or other data. In one example, data migrated 154 represents the transfer of data 126, or the critical data to be migrated in the event of a hardware failure. The critical data can be selected critical data that has been identified for migration.

In one example, host OSes 116 can select which data will be protected by IPUs 130 in the case of host platform failure. In one example, host OSes 116 can identify a region to be used to save critical data, such as cryptographic keys or computational results. The host OSes can then pass the selected regions as address ranges to IPUs 130 for data migration protection. In one example, host OSes 116 can manage configuration of IPUs 130 with respect to data migration operation. Thus, host OSes 116 can provide configuration information for how data migration will be managed by IPUs 130 in response to a host failure.

Orchestrator 140 can manage what workloads different servers execute. Orchestrator 140 can manage the initiation and assignment of virtual machines (VMs) on platforms 110. In one example, in response to detection of a hardware failure in system 100, orchestrator 140 can evict pods (e.g., groups of VMs that perform a common function) from a failed platform. In one example, orchestrator 140 is a server node (e.g., an orchestrator server node) within system 100 that executes orchestrator operations for system 100.

Consider an example where platform 110[1] has data 126 to be protected by IPU 130[1] in the event of hardware failure of platform 110[1]. In such a scenario, agent 136[1] can detect (reactive) or predict (proactive) failure of processor 112[1] or a CPU that is executing a process or workload to which data 126 belongs. IPU 130[1] includes an interface to the host, including the hardware and software of platform 110[1]. IPU 130[1] includes an interface to a network, to connect to devices external to platform 110[1].

In one example, IPU 130[1] has a different computational domain from host OS 116[1] and can access data 126 from cache 122[1] and memory 124[1]. The different computational domain can enable IPU 130[1] to continue to operate even if the host processor and host OS fail. IPU 130[1] can initiate a transfer out of data 126 to another platform. In one example, the transfer out can be to pooled memory 150, as illustrated in system 100. Alternatively, IPU 130[1] could transfer data 126 out to a remote storage device (not specifically illustrated). Alternatively, IPU 130[1] could transfer data 126 out to storage on IPU 130[1] or storage local to platform 110[1]. There can be a preference to transfer the data to a shared or pooled resource.

The transfer of data 126 preserves the data for migration to a different platform. In one example, IPU 130[1] notifies orchestrator 140 of the hardware failure of platform 110[1]. Orchestrator 140 can be a server of system 100 that manages containers, such as a Kubernetes agent or other container manager. In response to the notification, orchestrator 140 can allocate a VM or other resources on another platform to receive the data. As illustrated, platform 110[2] can receive the migrated data. Processor 112[2] can connect to IPU 130[1] with hot standby access to receive data 126. IPU 130[1] can pass the data to platform 110[2] for execution by one or more VMs allocated on platform 110[2] by orchestrator 140 to handle the data.

In accordance with what is described above, system 100 has a mechanism to reduce downtime for critical services when a failure occurs on a particular CPU or node. The reduction of downtime can apply whether the failure is a transient failure (e.g., a recovery routine can restore the hardware to expected operation) or a permanent failure (e.g., the hardware will not be able to recover operation, which would typically result in hardware replacement).

In one example, services or workloads or other elements executing within a VM can specify to orchestrator 140 which memory ranges are important to be copied or migrated in the event of node failure. Data 126 represents the data to be protected for platform 110[1]. System 100 does not specifically illustrate the memory sections or ranges for platform 110[2] that will be protected. Instead of notifying orchestrator 140, the service can use different memory allocation libraries or functions or source-level code pragmas around key data structures to implicitly indicate the need for special handling in the event of hardware failure.

In one example, when an IPU detects a failure on the CPU, the IPU starts migration of the memory ranges specified for each of the applications into a pooled memory or storage node. In one example, migration includes flushing all the cache hierarchies using CXL.mem (if coherency methods are available). In one example, migration includes double data rate (DDR) memory movement to a pooled memory. In one example, agents 136 include a home agent in IPUs 130 that knows the system address decoding schemes in case a CPU home agent is not reachable. In general, failure detection can be extended to application/service failure or recoverable memory failure that can be viewed as a warning sign.

IPUs 130 can notify orchestrator 140 of the failure, indicating a list of services with process address space identifiers (PASIDs) and memory ranges to be moved into the pooled or into IPU memory for service migration. IPUs 130 can send the notification when they start to migrate the data. In one example, PASIDs are universally unique identifiers (UUIDs) for services.

In one example, orchestrator 140 spawns a new instance of each service or application after that data has been copied into the target nodes from the pooled memory. In one example, orchestrator 140 can instantiate applications while data has not been fully copied. In the case where orchestrator 140 creates application instances before a full migration of the data, the CPU of the target node can be configured to have the home for the memory ranges being copied as the original IPUs where the node failed. In one example, the original IPU sends the requests coming from the new services to the pooled memory or local to the IPU if data has not been copied already. In one example, the mapping of the data is set up already, allowing the data to be loaded lazily when it is needed.

The ability to monitor the hardware with the IPU and migrate volatile data with the IPU enables system 100 to reduce hardware provisioning costs while reducing system downtime. IPUs 130 can be primarily responsible to copy critical data whenever a failure is detected or when the IPU identifies a highly probably near-term failure. In one example, IPUs 130 will transform the critical data for migration. In system 100, in one example, platforms 110 will work with IPUs 130 to setup the memory ranges per PASID that need to be migrated in the event of failure. In one example, orchestrator 140 is responsible to articulate the data migration and data restore. The migration can occur through a pooled memory or storage resource, such as pooled memory 150, to perform the storage of the state of the applications or services.

The IPU that is present on the same node as the CPU can perform multiple functions with respect to protecting volatile data in the event of hardware failure of the primary computing domain of the node. IPUs 130 can facilitate direct access to a failed CPU's memory and caches (e.g., caches 122 and memory 124) and copy data as needed, ensuring that intermediate results and in-memory data is not lost in the case of CPU failure.

In one example, IPUs 130 keep a local copy of key memory regions and a "directory" of in-memory data. The directory can include an indication of tenants, applications and application instances, memory regions for the application instances, alignment information, data format information, or other information. The alignment information and data format information can be useful to transform data for execution by a different server type, such as moving from an x86 architecture to a field programmable gate array (FPGA) or to an Advanced RISC (reduced instruction set computer) machine (ARM, available from ARM LIMITED) or to another architecture type. In one example, IPUs 130 perform data transformation or data translation services in case of recovery.

In one example, IPUs 130 facilitate a standby node to take over critical data with CXL-tunneling based access to the volatile memory of the failed CPU. The CXL-tunneling can enable business continuity while the critical data is being copied over to the standby node. Such an approach can eliminate the need to always provision 2X the memory for hot standby.

In one example, IPUs 130 can perform heuristic evaluation of the costs and benefits to move workloads off a node onto a different node or off specific unhealthy cores onto other healthy cores. In one example, IPUs 130 include machine learning (ML) or artificial intelligence (AI) algorithms to perform the heuristic computations. The evaluation can include not just the availability of compute resources, but also the time to move to remote storage, available bandwidth to perform a migration, impact on service level agreements (SLAB), or other factors.

In one example, instead of simple memory regions, system 100 can enable the migration of selected files. In one example, IPUs 130 include ML or AI to predict and start allocating new storage resources locally or remotely to avoid workload downtime. IPUs 130 could prepare keys and other security components ahead of time to provide seamless transition of data, while increasing the speed of the transition. In one example, IPUs 130 can proactively start copying critical data from a host predicted to fail to other locations, such as IPU storage, or remote storage. Such proactive operation can be based on telemetry data, such as thermal condition of the host platform.

In one example, the host platform to which an IPU is connected will support a tiered memory architecture. A tiered memory architecture includes a tier of volatile memory, such as a dynamic random access memory (DRAM), and a tier of persistent or nonvolatile memory, such as OPTANE (available from INTEL CORPORATION) or data center persistent memory module (DCPMM). With a tiered memory architecture, the IPU can support logic to move critical data from volatile memory to other memory tiers. Using a tiered memory structure to save critical data from being lost could be leveraged in either the case of detection of a failure or proactive migration in response to identifying an expected failure.

Figure 2:
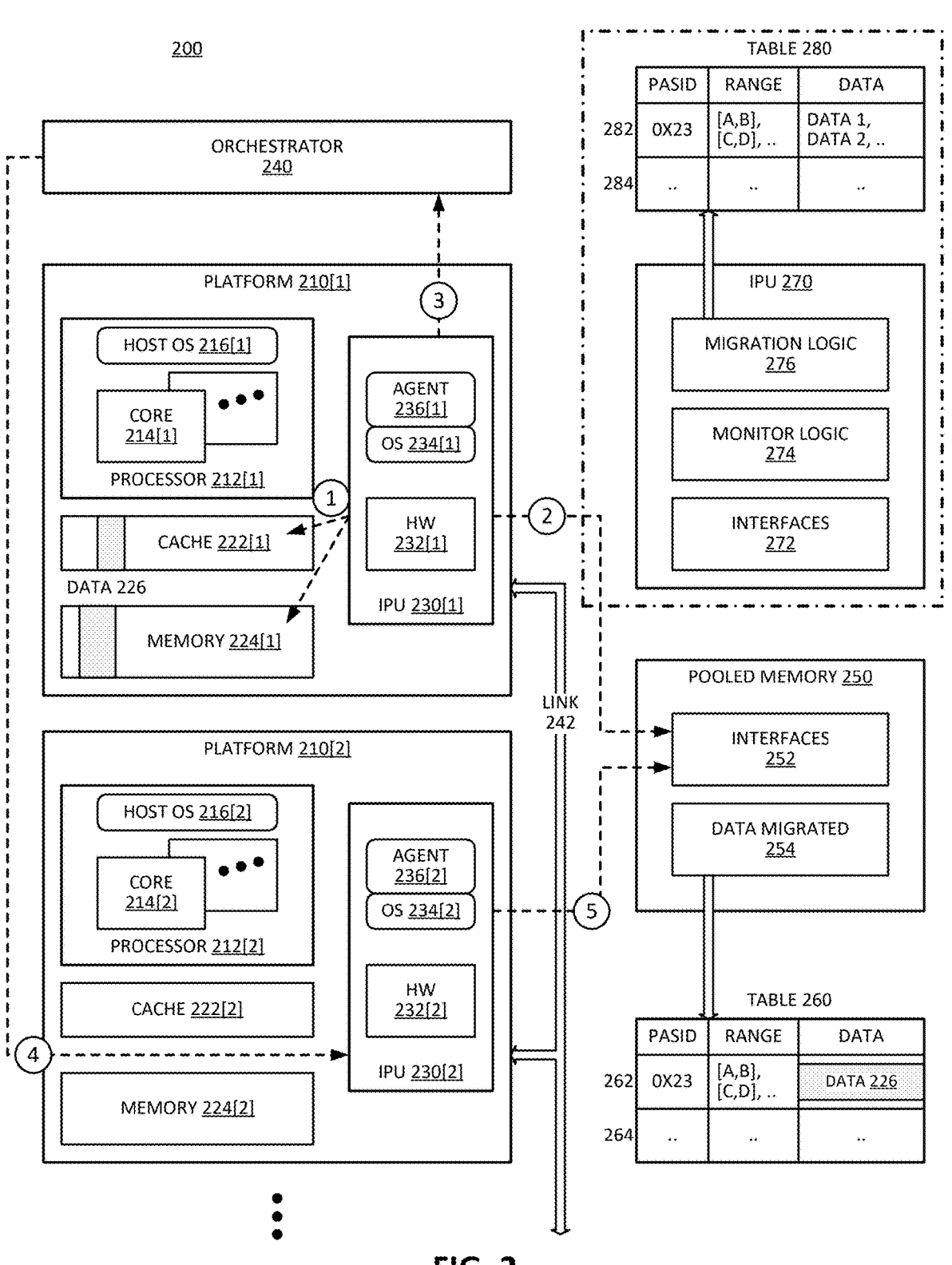
FIG. 2 is a block diagram of an example of a system with volatile memory migration based on process identifier.

FIG. 2 is a block diagram of an example of a system with volatile memory migration based on process identifier. System 200 is a system in accordance with an example of system 100. The descriptions of system 100 apply to similarly numbered components of system 200.

More specifically, the descriptions of platform 110[1], platform 110[2], . . . , processor 112[1], processor 112[2], . . . , cores 114[1], cores 114[2], . . . , host OS 116[1], host OS 116[2], . . . , cache 122[1], cache 122[2], . . . , memory 124[1], memory 124[2], . . . , IPU 130[1], IPU 130[2], . . . , HW 132[1], HW 132[2], . . . , OS 134[1], OS 134[2], . . . , agent 136[1], agent 136[2], . . . , link 142, pooled memory 150, interfaces 152, data migrated 154, data 126, and orchestrator 140 apply, respectively, to platform 210[1], platform 210[2], . . . , collectively platforms 210, processor 212[1], processor 212[2], . . . , collectively processors 212, cores 214[1], cores 214[2], . . . , collectively cores 214, host OS 216[1], host OS 216[2], . . . , collectively host OSes 216, cache 222[1], cache 222[2], . . . , collectively caches 222, memory 224[1], memory 224[2], . . . , collectively memory 224, IPU 230[1], IPU 230[2], . . . , collectively IPUs 230, HW 232[1], HW 232[2], . . . , collectively hardware 232, OS 234[1], OS 234[2], . . . , collectively OSes 234, agent 236[1], agent 236[2], . . . , collectively agents 236, link 242, pooled memory 250, interfaces 252, data migrated 254, data 226, and orchestrator 240.

The circled numbers in system 200 represent one example of a possible flow for operations related to data migration in response to a hardware failure. In one example, platforms 210 have an interface that allows the OS or any system software stack to specify ranges to be migrated in case of failure. Data 226 in cache 222[1] and memory 224[1] represents data identified by host OS 216[1] or applications running under host OS 216[1] with the interface. At 'Circle 1', IPU 320 can access data 226.

In one example, the interface allows the software elements to provide the PASID for which the address ranges need to be copied, and a list of memory ranges that need to be copied. The list can include an identifier (ID) of the memory range for later identification of the data structure.

Thus, for example, the ID can identify a memory range to which a given structure belongs. In one example, the ID is a UUID. In one example, the list can include address ranges of a format [A,B] where A is the starting address of the range, and B is the ending address of the range. In one example, the list can include a potential device ID in case the address range is in a different domain, such as being in main system memory versus being in GPU memory.

In one example, platforms 210 can include an interface mechanism, such as through machine specific registers (MSRs), to enable IPUs 230 to identify when an issue occurs with the node and identify a potential failure. In one example, agents 236 monitor the interface mechanism to determine health of the platform hardware.

The interface mechanism can be updated in one or more of a variety of ways. The updating can be performed by any one of, or a combination of, the following. In one example, host OSes 216 generate a heartbeat signal to notify that the system is alive. In one example, host OSes 216 generate a heartbeat to notify that a given application represented by a PASID is alive. In one example, a BMC for system 200 (not specifically illustrated) can generate a heartbeat to notify that the system is not responding. In one example, the BMC generate a heartbeat to notify that the system detecting one or more errors that may generate a system failure.

Agents 236 can represent logic on IPUs 230 to perform operations related to monitoring the health of the platforms, or determining when there is a system failure of a platform and taking action to avoid loss of selected volatile memory contents in response to the system failure. Agents 236 can be configurable. In one example, agents 236 are part of OSes 234. In one example, agents 236 are applications or services separate from the OS.

Agents 236 can implement the interface mechanism referred to above. In one example, agents 236 have access to a read only memory (ROM) or media location that stores the ranges for PASIDs to be copied in the event of failure. Agents 236 can implement monitoring logic to access the heartbeats described above and decide when on application or the system has experienced a fatal error. Agents 236 can start data migration in response to a determination that the fatal error has occurred.

At 'Circle 2', in one example, IPU 230[1] has determined that platform 210[1] has experienced a fatal error. At 'Circle 1', IPU 230[1] can identify if the coherent domains are still alive after detecting the application or the system is down. In one example, if the coherent domains are still alive, IPU 230[1] sends one or more flush commands to the various home agents. If the home agents (HAs) do not include flush options, IPU 230[1] can generate evictions or flushes for the memory ranges that need to be migrated. In one example, if the coherent domains are not still alive, IPU 230[1] can note that the migrated memory ranges did not have whatever changes were made on the cache.

In one example, at 'Circle 2', IPU 230[1] connects to interfaces 252 of pooled memory 250 to indicate the amount of data to be migrated. In one example, IPU 230[1] provides a notification per failed PASID how much data will be migrated for each PASID. IPU 230[1] can initiate the process of copying the data to pooled memory 250. In a case where the memory range is not accessible, IPU 230[1] can note the inability to access the range and notify pooled memory 250 that the range is inaccessible. IPU 230[1] can also notify pooled memory 250 of migrated memory ranges that do not include changes that were in cache.

In one example, at 'Circle 3', IPU 230[1] notifies orchestrator 240 that the failure has occurred. IPU 230[1] can indicate the PASIDs that are down due to the hardware failure on platform 210[1]. IPU 230[1] can indicate to orchestrator 240 that the memory range has been copied for a particular PASID.

In one example, orchestrator 240 determines to restore data to platform 210[2]. In one example, in response to the notification from IPU 230[1], orchestrator 240 determines another node to host the service or services that shut down. Orchestrator 240 can individually move services to other hosts. Thus, orchestrator 240 can select different hosts for different services. For purposes of system 200, consider that orchestrator 240 selects platform 210[2] to host at least one of the services that went down due to the failure of platform 210[1].

Once orchestrator 240 has identified a node to migrate the data and the service, orchestrator 240 can instantiate the service on the new node or platform (e.g., via a docker). Once the service is instantiated on the new platform, orchestrator 240 can notify the service to provide the buffers or data pointers where the data needs to be restored. The service can provide a list of memory points (e.g., virtual or physical) plus the ID of the structure. The ID of the structure can be what was referred to above with respect to the interface that enables passing the list to the IPU.

At 'Circle 4', orchestrator 240 notifies IPU 230[2] of the data to be restored to platform 210[2]. Orchestrator 240 can indicate a particular PASID to IPU 230[2] for migration to the node local to IPU 230[2]. In one example, orchestrator 240 provides the PASID ID as set out in pooled memory 250 and a list of memory ranges of pooled memory 250 to be copied. Orchestrator 240 can indicate a mapping of the address ranges into local memory ranges and devices of platform 210[2] where data needs to be copied.

At 'Circle 5', IPU 230[2] can connect to pooled memory 250 to pull the data and write it locally to the corresponding memory device, such as memory 224[2]. Once the copy is complete, IPU 230[2] can notify orchestrator 240. In one example, orchestrator 240 notifies the one or more IPUs selected to host the data to perform the copy for the various address ranges in pooled memory 250. Once the IPU performs the copy, the service on the IPU's node can start working again. In one example, the service itself is configured to start working after completion of the copy. In one example, a docker or the platform runtime starts the service after completion of the copy.

In one example, platforms 210 implement a dirty page tracking system that keeps track of pages that have been modified. When host OSes 216 start execution, they can initialize the IPU with the information of the region of memory in which it maintains the dirty page log. Initially, all pages should be clean. As the processes run, the pages should be touched and hence become dirty.

In one example, IPUs 230 can obtain dirty page information by periodically reading the dirty page log kept by the platform. In one example, processors 212 implement an engine that moves the dirty page log into respective IPUs 230. In one example, IPUs 230 are CXL connected to their respective platforms 210, and processors 212 store the dirty page log in the CXL memory on the IPU.

In one example, IPUs 230 maintain a count of the necessary dirty pages. If the dirty page count reaches a certain threshold, the dirty pages can be copied over to an IPU-managed memory, and the IPU resets the count to zero. In one example, after monitoring dirty page information, IPUs 230 check the platform for a heartbeat signal. If the heartbeat is good, then the IPU can continue looping to monitor the dirty page information. In one example, if the heartbeat is not good, the IPU triggers a restoration flow, in which the IPU makes one final copy of all the necessary dirty pages, and then triggers the migration of critical data to another node as described above.

In one example, instead of tracking dirty pages, system 200 can perform dirty tracking at a sub-page granularity, which should minimize the amount of data that needs to be copied. In one example, system 200 will apply a "critical data" policy where only certain dirty pages (or sub-pages) with critical data are tracked for restoration.

System 200 illustrates additional details in IPU 270, which provides a generic representation of components of IPUs 230. IPU 270 is only numbered differently from IPUs 230 to avoid confusion in the reference numbers. For purposes of the migration flow in system 200, IPU 270 can specifically be an example of IPU 230[1], which performs migration of data 226.

IPU 270 can include interfaces 272, which represent interfaces to enable the IPU to connect with caches 222, memory 224, and processors 212 on the platforms. The interfaces can enable IPUs to connect with orchestrator 240, with other platforms 210, and with shared memory/storage resources, such as pooled memory 250. Interfaces 272 can include any number of interfaces, including but not limited to, CXL, PCIe, or other.

IPU 270 specifically illustrates monitor logic 274, which represents logic on the IPU to monitor the hardware of the platform with which the IPU is associated or on which it is deployed. Monitor logic 274 can be or include logic to enable monitoring one or more heartbeat signals as described above. Monitor logic 274 can include logic to perform other monitoring of logs or other telemetry data.

IPU 270 can include migration logic 276, which represents capability by the IPUs to migrate data in response to detection or determination of a system failure. Table 280 represents the data IPU 270 will migrate to another platform. Table 280 includes columns to represent the PASID or other identifier, the range of addresses for each PASID, and the data associated with the ranges. Row 282 illustrates a PASID of 0x23, with various address ranges represented in brackets, including range [A,B] and [C,D]. The data includes Data 1, Data 2, . . . . Row 284 will include similar information, but system 200 does not illustrate details for row 284.

It will be observed that data migrated 254 can also be represented by as table 260. Table 260 includes columns to represent the PASID or other identifier, the range of addresses for each PASID, and the data associated with the ranges. Table 260 can include row 262 to show PASID 0x23, with ranges [A,B], [C,D], . . . , and the data associated with the ranges is illustrated as data 226 from platform 210[1]. Row 264 will include similar information, but system 200 does not illustrate details for row 264.

Figure 3:
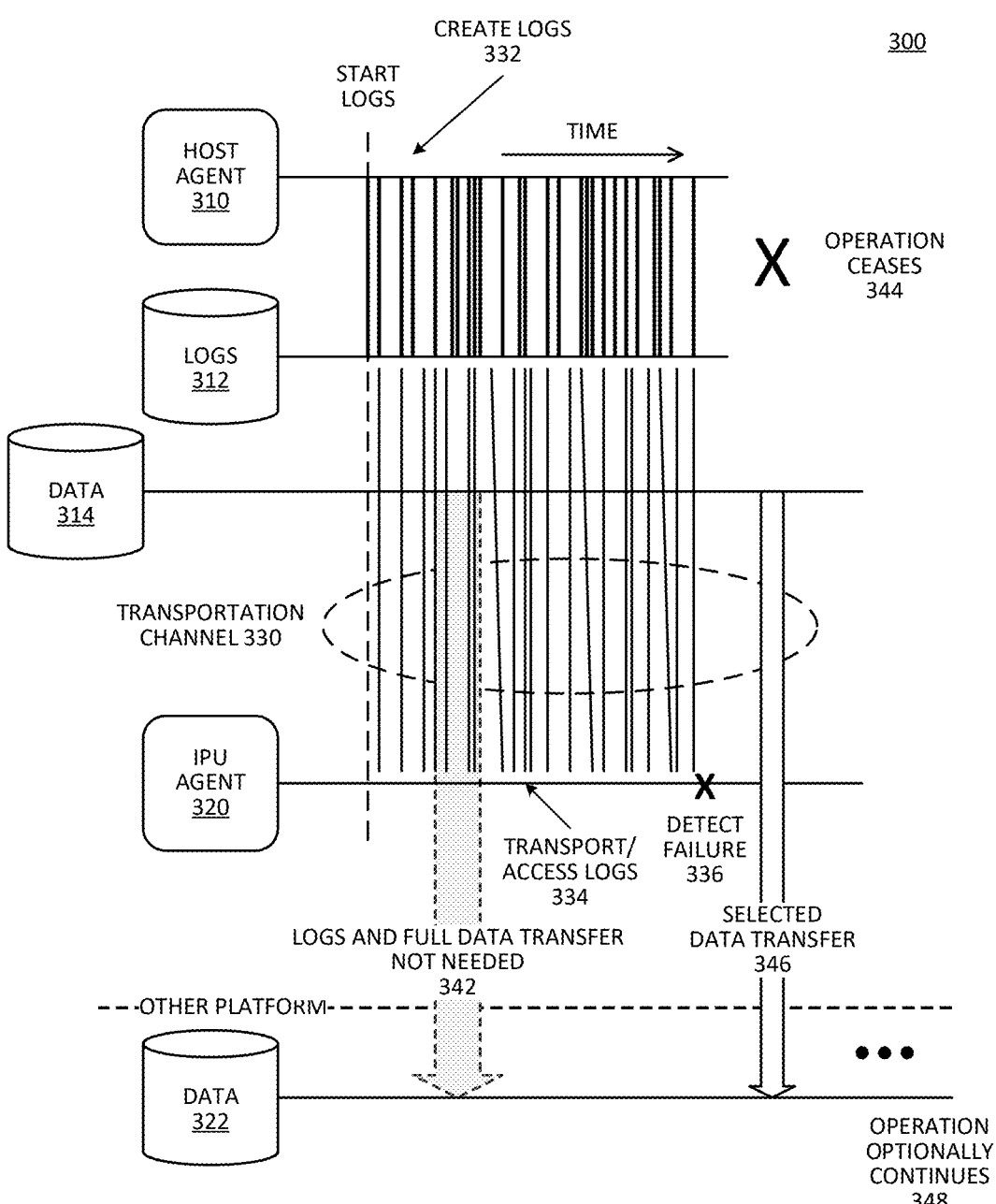
FIG. 3 is a block diagram of an example of a system that provides data logs to an infrastructure processing unit (IPU) for failure monitoring.

FIG. 3 is a block diagram of an example of a system that provides data logs to an IPU for failure monitoring. System 300 represents data transfer in accordance with an example of system 100 or an example of system 200.

System 300 illustrates a data transfer structure illustrating additional capabilities of IPU monitoring with respect to a hot standby mode or an active replication implementation. In system 300, the data transfer enabled through an IPU or DPU or smart NIC on the platform is in accordance with what is described herein.

Without IPU monitoring, hot standby and active replication could require allocation of double the data resources: one portion of data resources on one platform stores the data, and a second portion of data resources on a different platform stores the backup. In system 300, the "other platform" line is indicated between IPU agent 320 and data 322. IPU agent 320 can be implemented in a distributed manner instead of being limited to use of an agent at the duplication platform. For example, the agent at the other system could be an SAP HANA (a High-performance ANalytics Appliance) system available from SAP SE of Walldorf, Germany. The host agent could also be an SAP HANA system.

With IPU agent 320, the logs do not necessarily need to be transferred from the host platform to the other platform. Thus, system 300 can save the bandwidth of transferring each log to the other platform, which could be a continuous transfer of logs. Additionally, a periodic full data transfer of all data from the host platform to the other platform would not be needed with IPU monitoring that enables the migration of selected critical data. The regular syncing of contents between the nodes consumes a significant amount of bandwidth, in addition to the doubling of the resources to enable the replication of data. The additional resources and bandwidth use still does protect volatile data against loss in the case of hardware failure. Rather, immediate results of computations or queries could exist only in volatile memory for a failure between log or data transfers, because synchronization can only happen at discrete intervals.

System 300 can save selected memory resources (e.g., memory identified as critical) without the overhead of saving all host platform data to the other platform, which can save transfer bandwidth. System 300 includes a host platform with host agent 310 that manages the operation of the platform. In one example, host agent 310 is an SAP HANA system. Host agent 310 can create logs 332, which are stored in the host platform as logs 312.

System 300 includes IPU agent 320, which can access logs at 334. In one example, host agent 310 can transport logs 312 to IPU agent 320. In one example, IPU agent 320 accesses logs 312. Transportation channel 330 can represent one or more communication links to enable IPU agent 320 to access the logs and data of the host platform. Transportation channel 330 can represent one or more communication links to enable the other platform to access data from the host platform.

With IPU monitoring, system 300 does not necessarily need full data transfer from the host platform to the other platform, at 342. In one example, based on logs 312 received and processed at IPU agent 320, IPU agent 320 can detect a failure of the host platform, at 336. Even though there is a hardware failure, the IPU is a separate domain from the host OS, which enables IPU agent 320 to continue to have access to data 314. Thus, with the hardware failure, host agent 310 ceases operation at 344 and is unable to continue to sync data.

IPU agent 320 can continue operation because it is a separate domain. Instead of performing continuous syncing of data 314 to a secondary platform, IPU agent 320 can perform selected data transfer 346 of some of data 314 after detection of the failure. The selected data can be critical data, which can be identified at system initialization. Transfer of selected data based on a failure determination can eliminate the need to transfer all the data and logs over the network. The logs have a very short path to the local IPU.

IPU agent 320 can transfer selected portions of data 314 to data 322 of the other platform. The system can optionally continue operation of the applications and services associated with the selected data migration, at 348. Thus, the system can preserve the data on another platform and can optionally continue operation on the data on another platform. In one example, the system migrates the data to one platform, and then selects a server node to continue operation, moving the data to the node that will continue operation.

Figure 4:
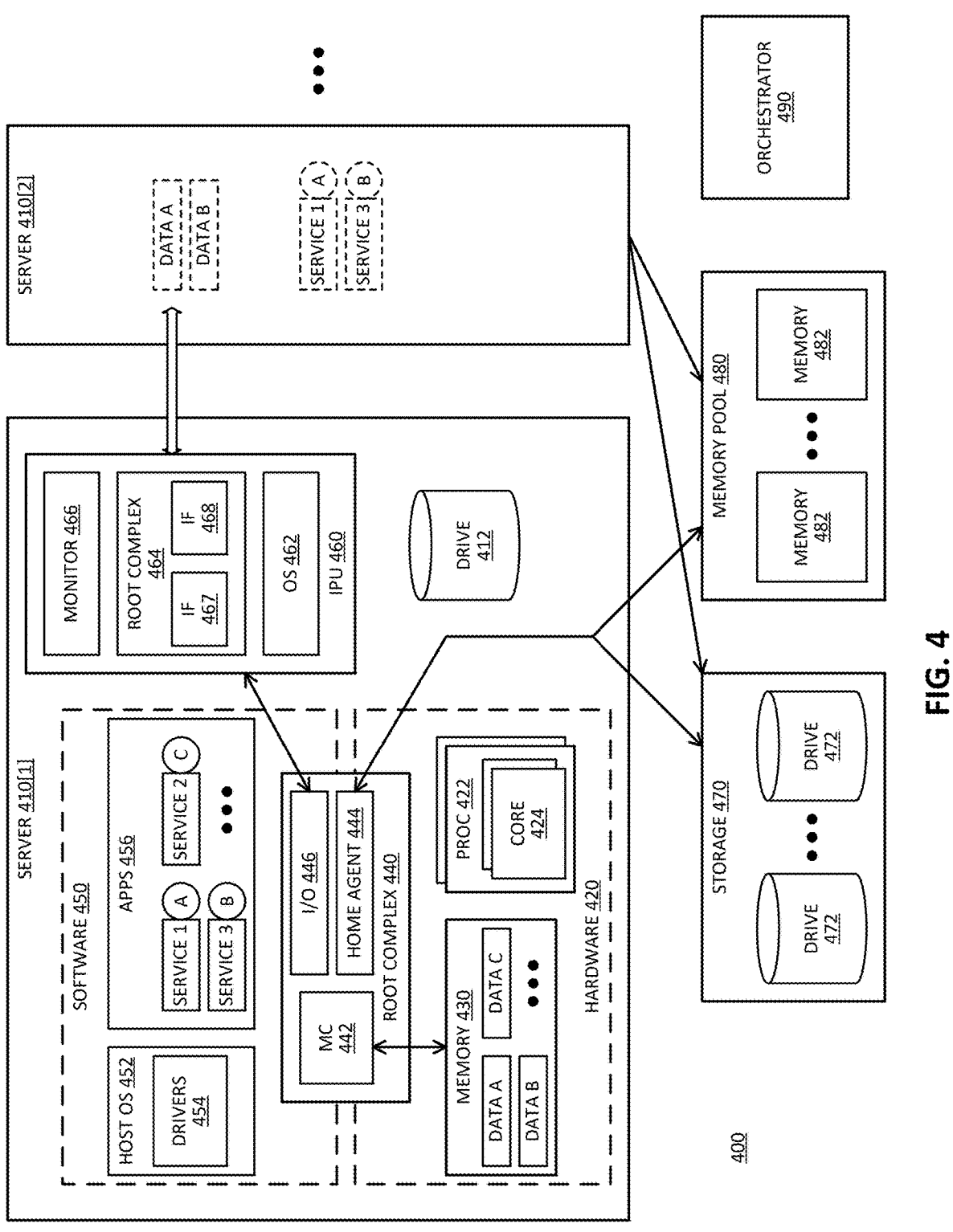
FIG. 4 is a block diagram of an example of a system with multiple servers.

FIG. 4 is a block diagram of an example of a system with multiple servers. System 400 represents a system in accordance with an example of system 100 or an example of system 200. System 400 illustrates a server system or server environment that includes multiple servers, shared storage, and shared memory. System 400 includes IPUs in the server nodes that can monitor their respective server nodes for failure, and effect a data migration of selected data in response to a failure.

System 400 specifically illustrates server 410[1] and server 410[2], collectively server 410. There can be N servers, where N is any number greater than 1. N can be in the dozens or in the hundreds. System 400 illustrates details for server 410[1] and does not illustrate the details of server 410[2]. The details of server 410[2] can e the same or similar to server 410[1].

Servers 410 include hardware 420, which represents the hardware components that enable operation of the server. Servers 410 include software 450, which represents the software components executed on hardware 420. Servers 410 include IPUs, represented by IPU 460 in server 410[1]. The IPUs can be in accordance with any example herein.

Hardware 420 includes one or more processors (PROC) 422, which can be or include CPUs, GPUs, or other processors. Processors 422 can include one or multiple cores 424 to perform computations for the server. Processors 422 execute instructions, perform computations, and otherwise execute code to implement software 450 and the workloads or tasks of the software components.

Hardware 420 includes memory 430, which represents system memory. Memory 430 typically includes volatile memory resources. In one example, server 410[1] includes drive 412, which can represent persistent or nonvolatile storage local to server 410[1]. Hardware 420 will also include one or more network interface circuits (NICs), which are not specifically illustrated. A NIC refers to a component that enables access to a communication link over a communication channel to components external to server 410[1], such as the shared memory, shared storage, other servers, wide area networks, or other resources.

Software 450 includes host OS 452 and applications (APPS) 456. Host OS 452 can include drivers 454, which represent software agents or services that enable access to and control of components of hardware 420. Applications 456 represent services are agents that execute under host OS 452. Typically, applications 456 access drivers 454 through application programming interfaces (APIs) to access hardware components of the server.

Servers 410 include root complex 440 or comparable control components. Root complex is illustrated overlapping hardware 420 and software 450. The control components of root complex include hardware elements as well as programmed elements. Root complex 440 includes support hardware, which can include application specific integrated circuits (ASICs), circuits on processors 422 (such as integrated memory controllers iMCs), or other components. The components execute firmware or embedded code to control access between the processors and the peripheral devices.

Root complex 440 can include memory controller (MC) 442, input/output hardware (I/O) 446, and home agent 444. Root complex 440 can include multiple of any one or more of the components illustrated. Root complex 440 can include other components not illustrated. Memory controller 442 manages access to memory 430. I/O 446 enables connections to communication channels, such as a PCIe link to IPU 460. Home agent 444 manages access to memory and storage components such as storage 470 and memory pool 480, which represent shared storage and share memory, respectively. In one example, home agent 444 accesses storage 470 and memory pool 480 through I/O 446.

Storage 470 includes multiple drives 472 to store data for various servers 410. Memory pool 480 includes multiple memory resources, represented by memory 482, to store data for various servers 410. The access, sharing of memory resources, and allocation of space to different servers will not be discussed in detail.

IPU 460 includes OS 462, which is separate from host OS 452, and provides the computational domain for the IPU. In one example, IPU 460 includes root complex 464, which represents hardware and firmware/software elements of the IPU to enable IPU 460 to access memory and other components in system 400. In one example, root complex 464 includes interface (IF) 467 and interface (IF) 468. IF 467 represents an interface of IPU 460 to connect to the host device, including processor 422 and memory 430. In one example, IF 467 can interface with host OS 452 and applications 456. In one example, IF 467 includes a PCIe interface. IF 468 represents an interface of IPU 460 to connect to a network external to the host device. In one example, IF 468 includes an Ethernet interface.

IPU 460 includes monitor 466, which represents one or more components to enable IPU 460 to monitor the health of server 410[1]. In one example, monitor 466 is or includes an application to determine the conditions of the hardware of server 410[1]. For example, monitor 466 could determine if the temperature of the server or specific components in the server (e.g., processor) is increasing past a threshold that indicates potential failure.

In response to a failure, IPU 460 can copy selected data to an internal storage or to external storage. Memory 430 illustrates Data A, Data B, and Data C. Applications 456 illustrate Service 1 associated with Data A, Service 2 associated with Data C, and Service 3 associated with Data B. Consider that Data A and Data B have been indicated as data ranges or data objects to migrate in case of failure.

In response to a failure of server 410[1] that results in a failure of host OS 452, IPU 460 can migrate the selected out of memory 430. In one example, IPU 460 migrates the data to drive 412. In one example, IPU 460 migrates the data to storage 470. In one example, IPU 460 migrates the data to memory pool 480. In one example, IPU 460 migrates the data to server 410[2].

Typically, IPU 460 would not directly migrate the data to server 410[2]. Rather, an orchestrator or system manager can manage such migration to another server. Orchestrator 490 represents the system manager for servers 410. In one example, orchestrator 490 is one of the servers in the system and operates to manage the workload distribution in system 400. IPU 460 can ensure that the data is available and identified for another server to access and complete the migration.

As illustrated, IPU 460 can perform a migration of Data A and Data B. System 400 illustrates that Data A and Data B are migrated to server 410[2]. Such a migration can occur as described above, where IPU 460 first migrates the data out of memory 430, and eventually either migrates the data to server 410[2], or stores the data in a shared resource that an IPU on server 410[2] can access. In one example, orchestrator 490 can initiate Service 1 and Service 3 on server 410[2]. Thus, server 410[2] can continue execution of the services with the migrated data.

Figure 5:
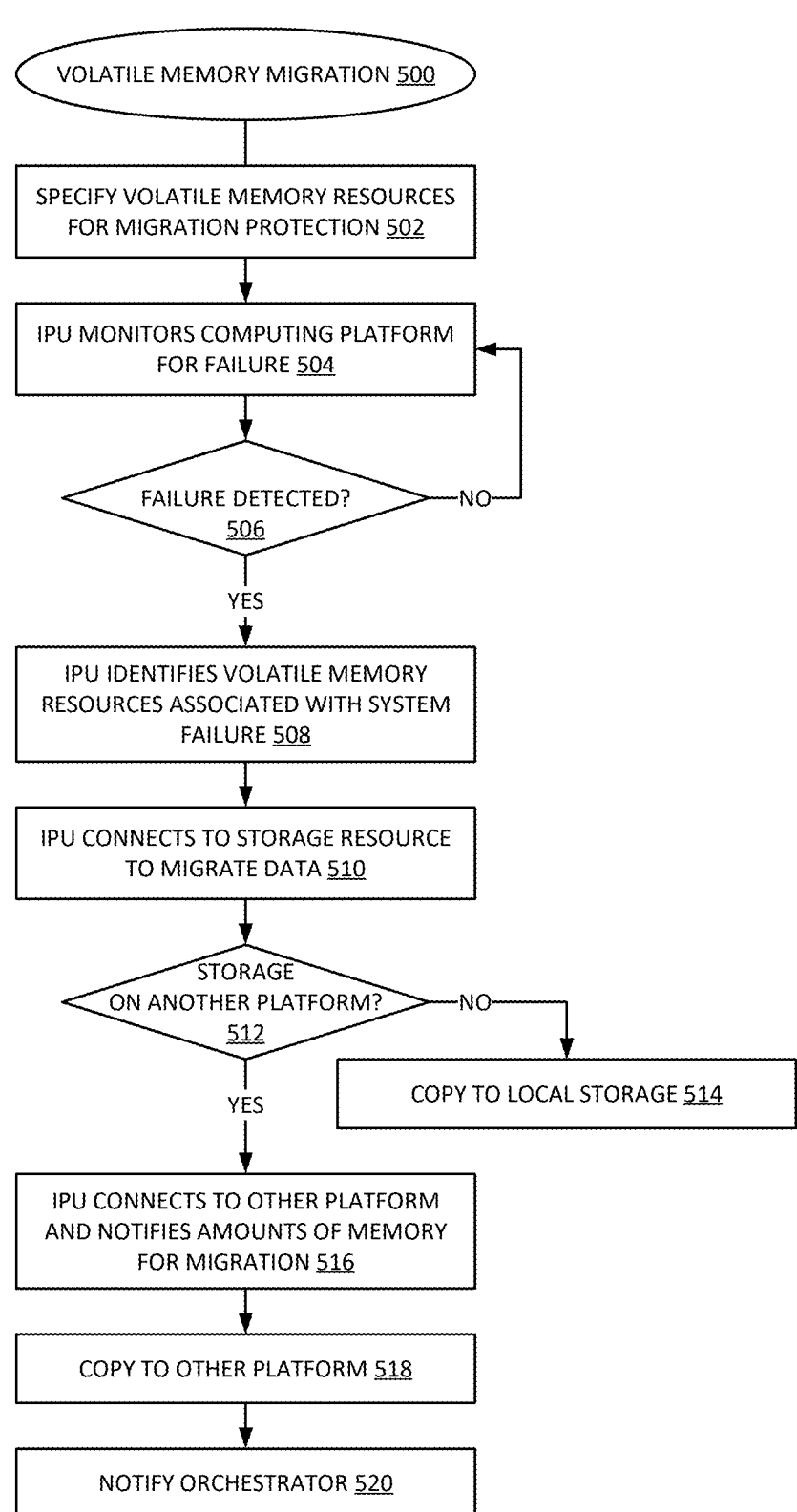
FIG. 5 is a flow diagram of an example of a process for volatile memory migration based on IPU monitoring.

FIG. 5 is a flow diagram of an example of a process for volatile memory migration based on IPU monitoring. Process 500 represents a process to migrate selected portions of memory in accordance with any system described.

In one example, a platform basic input/output system (BIOS) or configuration registers or an interface can enable the OS or applications or a service to specify ranges of volatile memory resources for migration protection in the event of a hardware failure, at 502. In one example, the system can specify ranges per PASID or service ID. In one example, the range can be specified with a device ID to indicate a computational resource to which the data belongs.

In one example, an IPU at a computing platform node monitors the node for failure, at 504. The IPU can identify errors that can result in failure. In one example, the IPU continually monitors a heartbeat signal, monitors system telemetry, system logs, or applies another mechanism to detect potential hardware failure. The potential failure is a failure that will take down at least one of the applications or services associated with the data to be protected. In one example, the potential failure is a failure that would result in the host OS going down, which would take down all applications/services. The migration of data can be per application/service on node, and is not necessarily for all data in the system.

If a failure is not detected, at 506 NO branch, the IPU continues to monitor, at 504. If the IPU detects a failure, at 506 YES branch, the IPU can identify the volatile memory resources associated with the system failure, at 508. In one example, the IPU stores a list of ranges that should be copied in the case of failure. The volatile memory resources can be identified at the system initialization to have the IPU identify the ranges previous indicated. The IPU can connect to storage resources to migrate the data, at 510.

In one example, the IPU can store the data to a local drive. Thus, if the storage is not on another platform, at 512 NO branch, the IPU can store the data to local persistent storage, at 514. Typically, the storage will be on another platform. If the storage is on another platform, at 512 YES branch, the IPU can connect to the other platform or a pooled storage and notify the amount of memory for migration, at 516.

The IPU can identify the service/application IDs associated with the data, the address ranges of the data, or other identifying information. The IPU can copy the data to the other platform, at 518. The IPU can migrate data per failed PASID or identifier. In one example, the IPU notifies the orchestrator or system manager of the failure and the migration of the data, at 520.

In one example, the orchestrator can restore data from a PASID into a node. The orchestrator can notify the IPU of the local node of the data restore, which can include identification of the data, similar to the identification provided by the IPU that migrated the data out of the failed node. The orchestrator can include a mapping of the local memory ranges and devices where the data needs to be copied for a restore. The IPU of the restore node can then access the data where it was stored by the migrating IPU.

Figure 6:
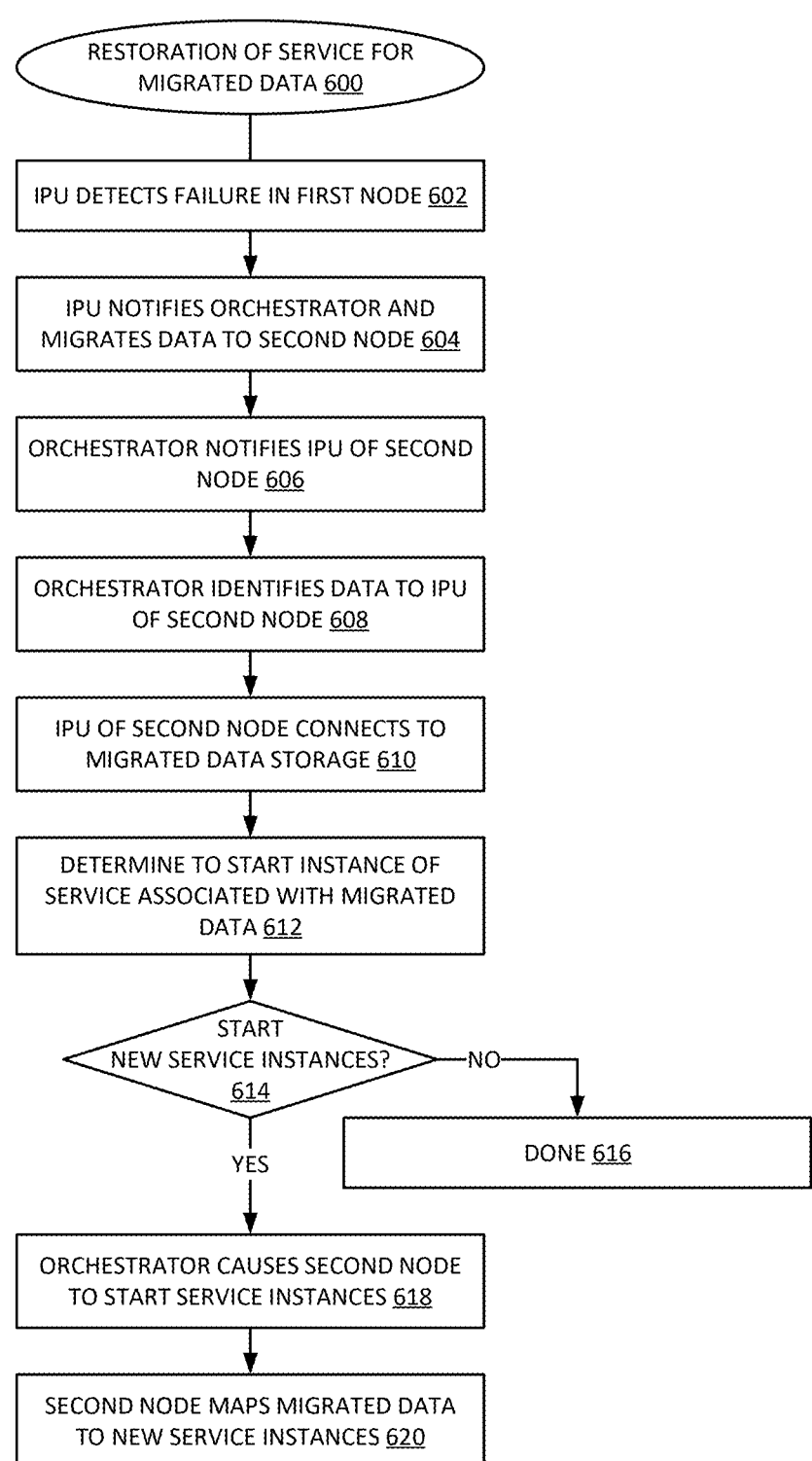
FIG. 6 is a flow diagram of an example of a process for restoration of a service after volatile memory migration to a different server node.

FIG. 6 is a flow diagram of an example of a process for restoration of a service after volatile memory migration to a different server node. Process 600 represents a process to restore services for migrated data in accordance with any system described.

An IPU of a first node detects a failure in the first node, at 602. The failure is a hardware failure that will result in at least one service or application being terminated. The failure could be the failure of the entire system. The IPU can notify the orchestrator of the failure, and the data to be migrated, and migrate the data to a second node, which can be a storage node, at 604.

The orchestrator can notify the IPU of the second node that the data will be restored to the second node, at 606. The orchestrator can identify the migrated data to the IPU of the second node, at 608. The IPU of the second can then connect to the storage node or storage device that holds the migrated data, at 610. The orchestrator can determine whether to start an instance of the service associated with the migrated data on the second node, at 612.

If the orchestrator determines not to start a new service instance, at 614 NO branch, the restoration process can be done, at 616. If the orchestrator determines to start one or more new service instances, at 614 YES branch, the orchestrator can cause the second node to start the service instances, at 618. The second node can then map migrated data to the new service instances, at 620.

The orchestrator can begin to perform a search to determine where to restore the service upon notification from the IPU of the first node. When the orchestrator identifies another node to host the service instance, the orchestrator can instantiate the service, notify the service to provide buffers or data pointers where the data needs to be restored. In one example, the orchestrator provides a list of memory points and the ID of the data structure. The orchestrator can notify the IPU of the second node to perform the copy for the various address ranges, which enables the service to start work on the data.

Figure 7:
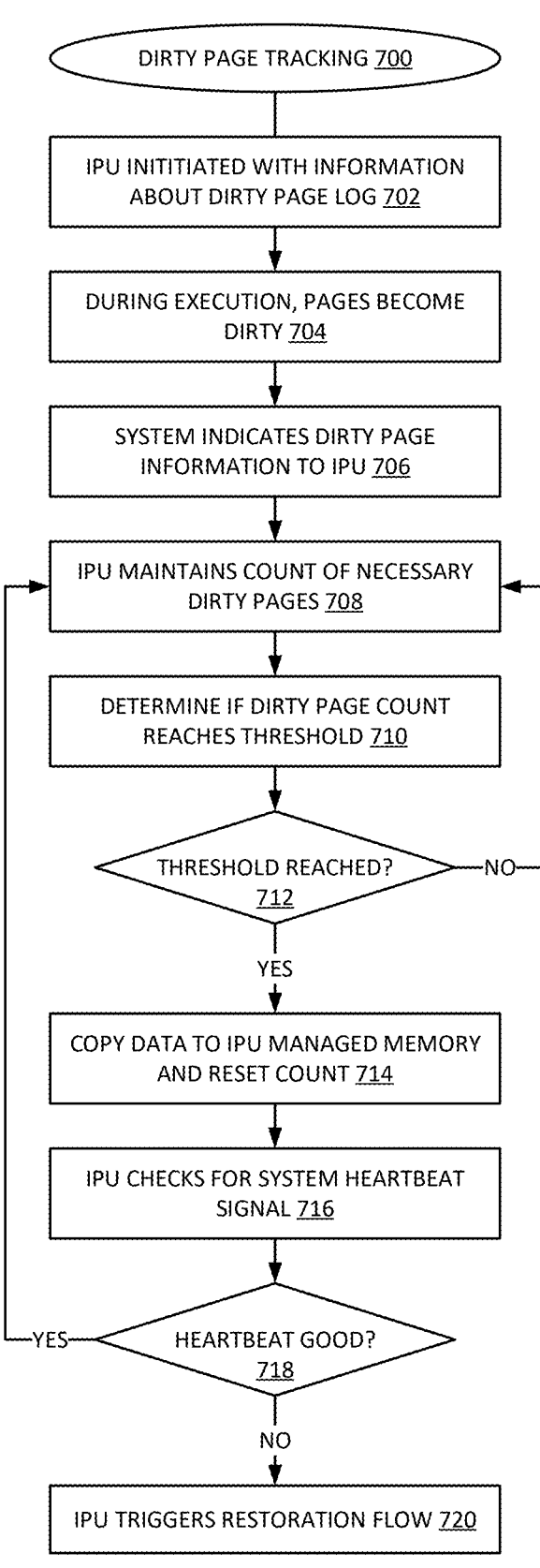
FIG. 7 is a flow diagram of an example of a process for dirty page tracking.

FIG. 7 is a flow diagram of an example of a process for dirty page tracking. Process 700 represents a process to track dirty pages or portions of dirty pages in accordance with any system described. Dirty pages or portions of dirty pages refer to pages or portions of pages that have been modified since they were last committed to memory.

The platform can initialize the IPU with dirty page log information, at 702. For example, the host OS can indicate a region of memory in which it maintains a dirty page log. While pages start out clean, during execution, the processes access the pages, modify the data on them, and the pages become dirty, at 704.

As the pages become dirty, the system indicates the dirty page information to the IPU, at 706. In one example, the IPU periodically reads the dirty page log to obtain the dirty page information created by the platform. In one example, the CPU can implement an engine that moves the dirty page log into the IPU. In one example, the IPU includes a CXL memory, and the system stores the dirty page log in the CXL memory.

In one example, the IPU maintains a count of the necessary dirty pages, at 708. The necessary dirty pages can refer to all dirty page data, or can refer to the dirty page data only for critical data, where the IPU only tracks data indicated as needing to be migrated in the event of a hardware failure. In one example, the system tracks dirty data at sub-page granularity, which minimizes the amount of data that needs to be copied.

In one example, the IPU determines if the dirty page count reaches a threshold, at 710. If the dirty page count has not reached the threshold, at 712 NO branch, the IPU can continue to maintain the count of dirty pages, at 708. If the dirty page count reaches the threshold, at 712 YES branch, the IPU can copy the dirty pages to a IPU managed memory reset the count to 0, at 714.

In one example, the IPU checks for a system heartbeat signal in accordance with any example above, at 716. If the heartbeat is good, at 718 YES branch, the IPU continues to track dirty page information, at 708. If the heartbeat is not good, at 718 NO branch, in one example, the IPU determines that there is a full or partial system failure, and triggers a restoration flow, at 720.

Figure 8:
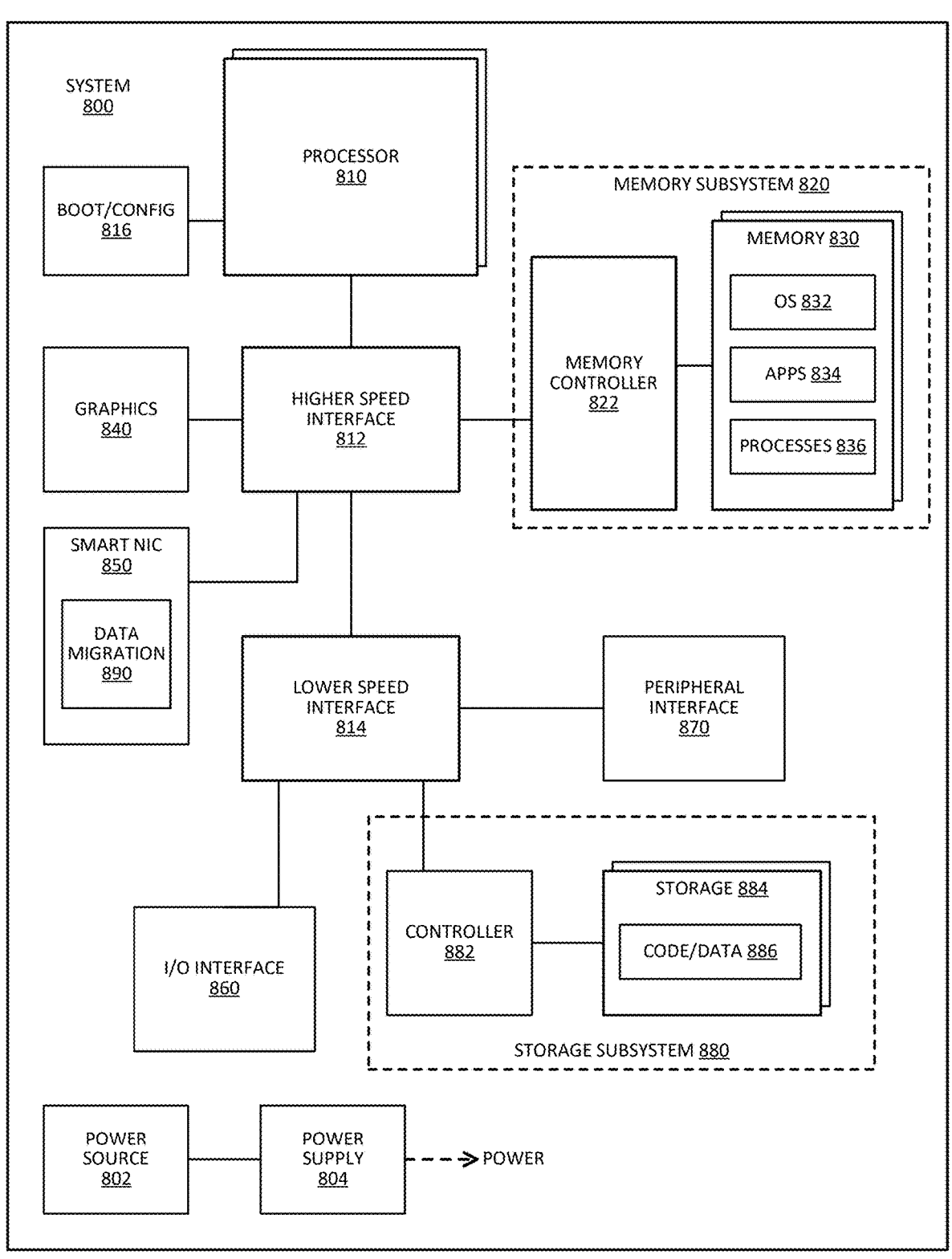
FIG. 8 is a block diagram of an example of a computing system in which volatile memory migration can be implemented.

FIG. 8 is a block diagram of an example of a computing system in which volatile memory migration can be implemented. System 800 represents a computing device in accordance with any example herein, and can be a server, a rack-based computing device or an IPU.

In one example, system 800 includes data migration 890, which represents components to enable data migration in response to a failure in accordance with any example herein. In one example, system 800 represents a server and data migration 890 represents interfaces and components of smart NIC 850 that performs data migration. In one example, smart NIC 850 is an IPU. With data migration 890, the IPU can manage the transfer of volatile memory from a server node in response to a hardware failure that causes an application or the host OS to terminate operation.

System 800 includes processor 810 can include any type of microprocessor, central processing unit (CPU), graphics processing unit (GPU), processing core, or other processing hardware, or a combination, to provide processing or execution of instructions for system 800. Processor 810 can be a host processor device. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or a combination of such devices.

System 800 includes boot/config 816, which represents storage to store boot code (e.g., basic input/output system (BIOS)), configuration settings, security hardware (e.g., trusted platform module (TPM)), or other system level hardware that operates outside of a host OS. Boot/config 816 can include a nonvolatile storage device, such as read-only memory (ROM), flash memory, or other memory devices.

In one example, system 800 includes interface 812 coupled to processor 810, which can represent a higher speed interface or a high throughput interface for system components that need higher bandwidth connections, such as memory subsystem 820 or graphics interface components 840. Interface 812 represents an interface circuit, which can be a standalone component or integrated onto a processor die. Interface 812 can be integrated as a circuit onto the processor die or integrated as a component on a system on a chip. Where present, graphics interface 840 interfaces to graphics components for providing a visual display to a user of system 800. Graphics interface 840 can be a standalone component or integrated onto the processor die or system on a chip. In one example, graphics interface 840 can drive a high definition (HD) display or ultra high definition (UHD) display that provides an output to a user. In one example, the display can include a touchscreen display. In one example, graphics interface 840 generates a display based on data stored in memory 830 or based on operations executed by processor 810 or both.

Memory subsystem 820 represents the main memory of system 800 and provides storage for code to be executed by processor 810, or data values to be used in executing a routine. Memory subsystem 820 can include one or more varieties of random-access memory (RAM) such as DRAM, 3DXP (three-dimensional crosspoint), or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810, such as integrated onto the processor die or a system on a chip.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 800 includes interface 814, which can be coupled to interface 812. Interface 814 can be a lower speed interface than interface 812. In one example, interface 814 represents an interface circuit, which can include standalone components and integrated circuitry. In one example, multiple user interface components or peripheral components, or both, couple to interface 814.

In one example, system 800 includes smart network interface circuit (NIC) 850, which provides system 800 the ability to communicate with remote devices (e.g., servers or other computing devices) over one or more networks. Smart NIC 850 can include an Ethernet adapter, wireless interconnection components, cellular network interconnection components, USB (universal serial bus), or other wired or wireless standards-based or proprietary interfaces. Smart NIC 850 can exchange data with a remote device, which can include sending data stored in memory or receiving data to be stored in memory. Smart NIC 850 interfaces with the host through higher speed interface 812. A host OS on processor 810 can offload tasks to smart NIC 850.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, NAND (persistent storage applying Not AND logic), three-dimensional crosspoint (3DXP), or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810, or can include circuits or logic in both processor 810 and interface 814.

Power source 802 provides power to the components of system 800. More specifically, power source 802 typically interfaces to one or multiple power supplies 804 in system 800 to provide power to the components of system 800. In one example, power supply 804 includes an AC to DC (alternating current to direct current) adapter to plug into a wall outlet. Such AC power can be renewable energy (e.g., solar power) power source 802. In one example, power source 802 includes a DC power source, such as an external AC to DC converter. In one example, power source 802 or power supply 804 includes wireless charging hardware to charge via proximity to a charging field. In one example, power source 802 can include an internal battery or fuel cell source.

Figure 9:
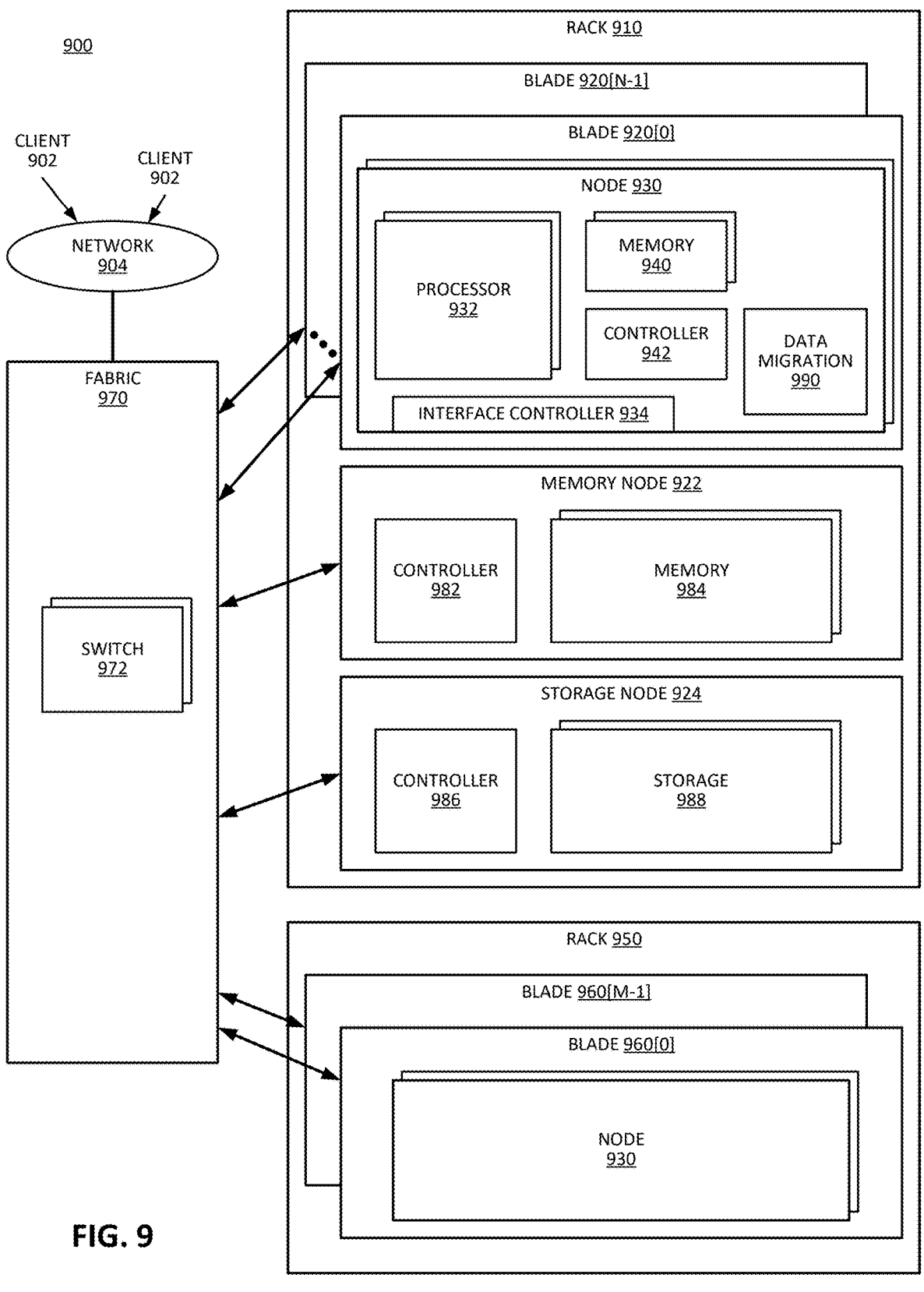
FIG. 9 is a block diagram of an example of a multi-node network in which volatile memory migration can be implemented.

FIG. 9 is a block diagram of an example of a multi-node network in which volatile memory migration can be implemented. System 900 represents a network of nodes. In one example, system 900 represents a data center. In one example, system 900 represents a server farm. In one example, system 900 represents a data cloud or a processing cloud.

Node 930 represents a computing device of blade 920[0] in system 900. In one example, node 930 includes data migration 990, which represents components to enable data migration in response to a failure in accordance with any example herein. In one example, node 930 represents a server and data migration 990 represents interfaces and components that enable interconnection with an IPU that performs data migration. In one example, node 930 represents an IPU and data migration 990 represents interfaces and components that enable the IPU to perform data migration. With data migration 990, the IPU can manage the transfer of volatile memory from a server node in response to a hardware failure that causes an application or the host OS to terminate operation.

One or more clients 902 make requests over network 904 to system 900. Network 904 represents one or more local networks, or wide area networks, or a combination. Clients 902 can be human or machine clients, which generate requests for the execution of operations by system 900. System 900 executes applications or data computation tasks requested by clients 902.

In one example, system 900 includes one or more racks, which represent structural and interconnect resources to house and interconnect multiple computation nodes. In one example, rack 910 includes multiple nodes 930. In one example, rack 910 hosts multiple blade components, blade 920[0], . . . , blade 920[N−1], collectively blades 920. Hosting refers to providing power, structural or mechanical support, and interconnection. Blades 920 can refer to computing resources on printed circuit boards (PCBs), where a PCB houses the hardware components for one or more nodes 930. In one example, blades 920 do not include a chassis or housing or other "box" other than that provided by rack 910. In one example, blades 920 include housing with exposed connector to connect into rack 910. In one example, system 900 does not include rack 910, and each blade 920 includes a chassis or housing that can stack or otherwise reside in close proximity to other blades and allow interconnection of nodes 930.

System 900 includes fabric 970, which represents one or more interconnectors for nodes 930. In one example, fabric 970 includes multiple switches 972 or routers or other hardware to route signals among nodes 930. Additionally, fabric 970 can couple system 900 to network 904 for access by clients 902. In addition to routing equipment, fabric 970 can be considered to include the cables or ports or other hardware equipment to couple nodes 930 together. In one example, fabric 970 has one or more associated protocols to manage the routing of signals through system 900. In one example, the protocol or protocols is at least partly dependent on the hardware equipment used in system 900.

As illustrated, rack 910 includes N blades 920. In one example, in addition to rack 910, system 900 includes rack 950. As illustrated, rack 950 includes M blade components, blade 960[0], . . . , blade 960[M−1], collectively blades 960. M is not necessarily the same as N; thus, it will be understood that various different hardware equipment components could be used, and coupled together into system 900 over fabric 970. Blades 960 can be the same or similar to blades 920. Nodes 930 can be any type of node and are not necessarily all the same type of node. System 900 is not limited to being homogenous, nor is it limited to not being homogenous.

The nodes in system 900 can include compute nodes, memory nodes, storage nodes, accelerator nodes, or other nodes. Rack 910 is represented with memory node 922 and storage node 924, which represent shared system memory resources, and shared persistent storage, respectively. One or more nodes of rack 950 can be a memory node or a storage node.

Nodes 930 represent examples of compute nodes. For simplicity, only the compute node in blade 920[0] is illustrated in detail. However, other nodes in system 900 can be the same or similar. At least some nodes 930 are computation nodes, with processor (proc) 932 and memory 940. A computation node refers to a node with processing resources (e.g., one or more processors) that executes an operating system and can receive and process one or more tasks. In one example, at least some nodes 930 are server nodes with a server as processing resources represented by processor 932 and memory 940.

Memory node 922 represents an example of a memory node, with system memory external to the compute nodes. Memory nodes can include controller 982, which represents a processor on the node to manage access to the memory. The memory nodes include memory 984 as memory resources to be shared among multiple compute nodes.

Storage node 924 represents an example of a storage server, which refers to a node with more storage resources than a computation node, and rather than having processors for the execution of tasks, a storage server includes processing resources to manage access to the storage nodes within the storage server. Storage nodes can include controller 986 to manage access to the storage 988 of the storage node.

In one example, node 930 includes interface controller 934, which represents logic to control access by node 930 to fabric 970. The logic can include hardware resources to interconnect to the physical interconnection hardware. The logic can include software or firmware logic to manage the interconnection. In one example, interface controller 934 is or includes a host fabric interface, which can be a fabric interface in accordance with any example described herein. The interface controllers for memory node 922 and storage node 924 are not explicitly shown.

Processor 932 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 940 can be or include memory devices represented by memory 940 and a memory controller represented by controller 942.

Figure 10:
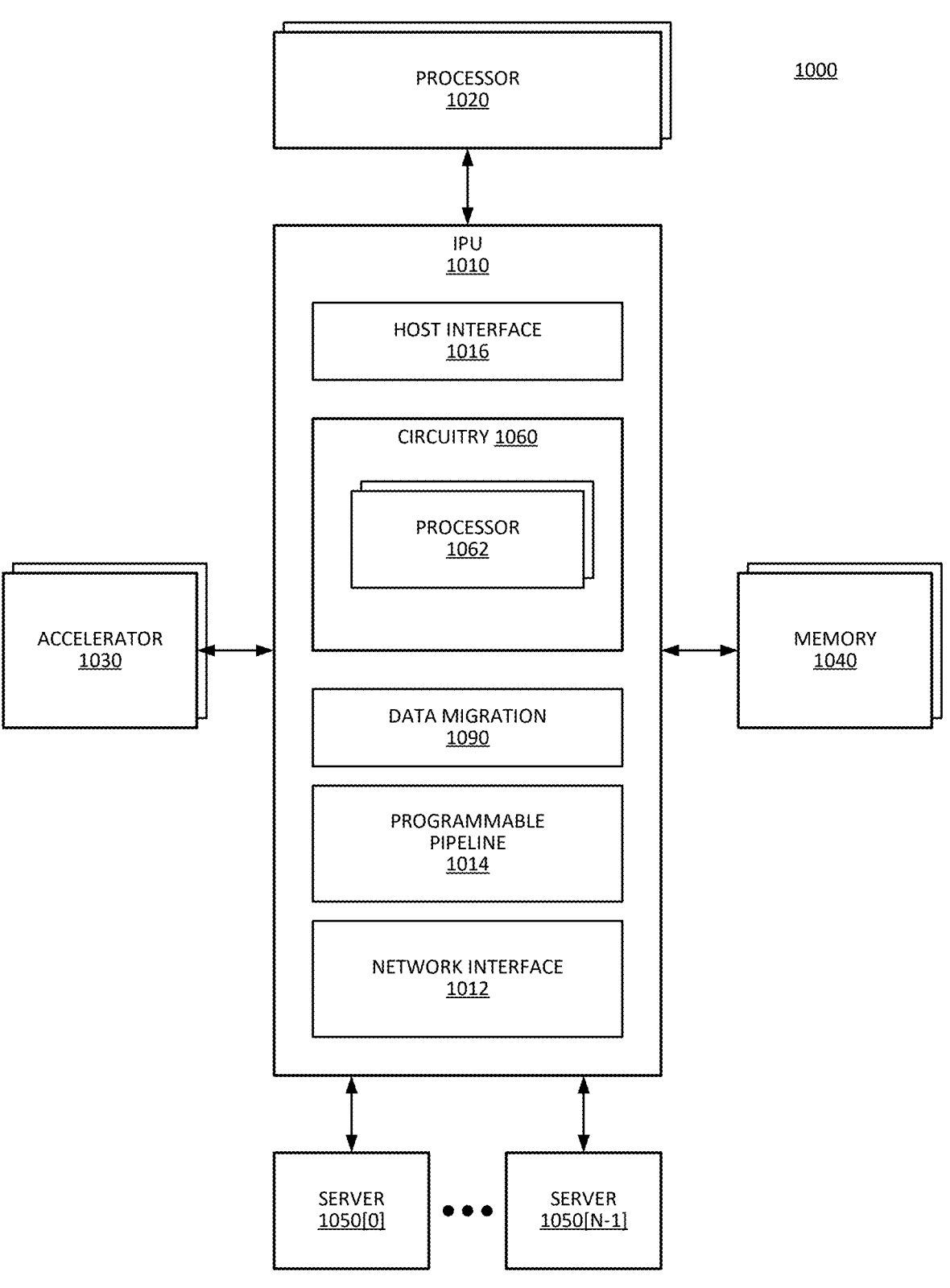
FIG. 10 is a block diagram of an example of a system with an intelligent processing unit.

FIG. 10 is a block diagram of an example of a system with an intelligent processing unit. System 1000 includes IPU (infrastructure processing unit) 1010 to provide processing and network interconnection. IPU 1010 includes circuitry 1060, which can include processors 1062 and one or more control circuits, such as circuits to control network interconnection operation.

In system 1000, IPU 1010 manages performance of one or more processes using one or more of processors 1062, processors 1020, accelerators 1030, memory 1040, or servers 1050[0:N−1], collectively, servers 1050, where N is an integer of 1 or more. Memory 1040 can represent a memory pool, having one or more memory devices that can be shared among one or more components of system 1000. In some examples, processor 1062 can execute one or more processes, applications, virtual machines (VMs), containers, microservices, and so forth, which request performance of workloads by one or more of: processors 1020, accelerators 1030, memory 1040, or servers 1050, or a combination of these.

IPU 1010 can utilize network interface 1012 or one or more device interfaces to communicate with processors 1020, accelerators 1030, memory 1040, and/or servers 1050. IPU 1010 can utilize programmable pipeline 1014 to process packets that are to be transmitted from network interface 1012 or packets received from network interface 1012. IPU 1010 includes host interface 1016 to interface with the host processor, processor 1020.

In one example, IPU 1010 includes data migration 1090, which represents components to enable data migration in response to a failure in accordance with any example herein. With data migration 1090, IPU 1010 can manage the transfer of volatile memory from a server node in response to a hardware failure that causes an application or the host OS to terminate operation.

Example 1 is a server system including: a processing core of a first computing platform; a memory on the first computing platform to store data for the processing core; and a processing unit having access to the memory, the processing unit including an interface to the processing core and the memory and including an interface to a network external to the processing core, the processing core to offload processing tasks to the processing unit, the processing unit to detect a failure of the processing core, and migrate the data to a second computing platform in response to detection of the failure.

Example 2 is a server system in accordance with Example 1, herein the processing core comprises a central processing unit (CPU).

Example 3 is a server system in accordance with Example 1, herein the processing core comprises a graphics processing unit (GPU).

Example 4 is a server system in accordance with any of Examples 1-3, wherein the memory comprises a random access memory (RAM) device.

Example 5 is a server system in accordance with any of Examples 1-4, wherein the memory comprises a cache device.

Example 6 is a server system in accordance with any of Examples 1-5, wherein the memory comprises a multitier memory hierarchy.

Example 7 is a server system in accordance with any of Examples 1-6, wherein the processing unit comprises an intelligent processing unit coupled to the processing core via a peripheral component interconnect express (PCIe) link.

Example 8 is a server system in accordance with any of Examples 1-7, wherein the second computing platform comprises a remote storage platform.

Example 9 is a server system in accordance with any of Examples 1-8, wherein the second computing platform comprises a pooled memory platform.

Example 10 is a server system in accordance with any of Examples 1-9, wherein the first computing platform comprises a first server node and the second computing platform comprises a second server node.

Example 11 is a server system in accordance with any of Examples 1-10, wherein the processing unit is to migrate selected critical data from the memory to the second computing platform.

Example 12 is a server system in accordance with any of Examples 1-11, wherein the processing unit is to migrate a selected address range of the memory to the second computing platform.

Example 13 is a server system in accordance with any of Examples 1-12, wherein the data includes cryptographic keys and computational results.

Example 14a is a server system in accordance with any of Examples 1-13, wherein the processing unit to detect the failure of the processing core comprises the processing unit to predict the failure of the processing core.

Example 14b is a server system in accordance with any of Examples 1-13, wherein the processing unit to detect the failure of the processing core comprises the processing unit to detect occurrence of a failure of the processing core.

Example 15 is a method for mitigating server failure including: detecting a failure of a processing core of a first computing platform with a processing unit having an interface to the processing core and including an interface to a network external to the processing core; and migrating data from a memory on the first computing platform that stores data for the processing core to a second computing platform in response to detecting the failure.

Example 16 is a method in accordance with Example 15, wherein detecting the failure of the processing core comprises predicting the failure of the processing core.

Example 17 is a method in accordance with either Example 15 or Example 16, herein the processing core comprises a central processing unit (CPU).

Example 18 is a method in accordance with either Example 15 or Example 16, herein the processing core comprises a graphics processing unit (GPU).

Example 19 is a method in accordance with any of Examples 15-18, wherein the memory comprises a random access memory (RAM) device.

Example 20 is a method in accordance with any of Examples 15-19, wherein the memory comprises a cache device.

Example 21 is a method in accordance with any of Examples 15-20, wherein the memory comprises a multitier memory hierarchy.

Example 22 is a method in accordance with any of Examples 15-21, wherein the processing unit comprises an intelligent processing unit coupled to the processing core via a peripheral component interconnect express (PCIe) link.

Example 23 is a method in accordance with any of Examples 15-22, wherein migrating the data to the second computing platform comprises migrating the data to a remote storage platform.

Example 24 is a method in accordance with any of Examples 15-22, wherein migrating the data to the second computing platform comprises migrating the data to a pooled memory platform.

Example 25 is a method in accordance with any of Examples 15-24, wherein the first computing platform comprises a first server node and the second computing platform comprises a second server node.

Example 26 is a method in accordance with any of Examples 15-25, wherein migrating the data to the second computing platform comprises migrating selected critical data from the memory to the second computing platform.

Example 27 is a method in accordance with any of Examples 15-26, wherein the processing unit migrates selected critical data from the memory to the second computing platform.

Example 28 is a method in accordance with any of Examples 15-27, wherein the processing unit migrates a selected address range of the memory to the second computing platform.

Example 29 is a method in accordance with any of Examples 15-28, wherein the data includes cryptographic keys and computational results.

Example 30 is a method in accordance with any of Examples 15-29, wherein the method includes instantiating a new instance of an application associated with the migrated data on a computing platform different from the first computing platform prior to completing migration of the data.

Example 31 is a method in accordance with any of Examples 15-30, wherein the processing unit sends requests from the new instance of the application to the second computing platform.

Example 32 is a computer readable storage medium having content stored thereon, which when executed, causes a machine to perform a method in accordance with any of Examples 15-31.

Example 33 is a server system including: multiple computing platforms having a host processor with a host operating system, a memory to store data for the host processor, and an infrastructure processing unit (IPU) separate from the host processor with a separate operating system, the IPU having access to the memory; and an orchestrator server node to manage the multiple computing platforms; wherein the IPU of a first computing platform of the multiple computing platforms capable to detect a failure of the host processor of the first computing platform, notify the orchestrator of the failure, and migrate the data out of the memory in response to detection of the failure.

Example 34 is a server system in accordance with Example 33, wherein the IPU of the first computing platform is to migrate the data to a second computing platform.

Example 35 is a server system in accordance with Example 33, wherein the IPU of the first computing platform is to migrate the data to internal storage of the first computing platform.

Example 36 is a server system in accordance with Example 33, wherein the IPU of the first computing platform is to migrate the data to a remote storage platform.

Example 37 is a server system in accordance with Example 33, wherein the IPU of the first computing platform is to migrate the data to a pooled memory platform.

Example 38 is a server system in accordance with any of Examples 32-37, wherein the processing unit is to migrate selected critical data from the memory to the second computing platform.

Example 39 is a server system in accordance with any of Examples 32-38, wherein the processing unit is to migrate a selected address range of the memory to the second computing platform.

Example 40 is a server system in accordance with any of Examples 32-39, wherein the data includes cryptographic keys and computational results.

Example 41 is a server system in accordance with any of Examples 32-40, wherein the processing unit to detect the failure of the processing core comprises the processing unit to predict the failure of the processing core.

Example 42 is a server system in accordance with any of Examples 32-41, wherein the IPU is configured to pass to the orchestrator a list of services with process address space identifiers (PASIDs) for the services and memory ranges to migrate from the memory.

Example 43 is a server system in accordance with any of Examples 32-42, wherein the orchestrator is to instantiate a new instance of an application associated with the migrated data on a computing platform different from the first computing platform prior to completion of migration of the data.

Example 44 is a server system in accordance with any of Examples 32-43, wherein the processing unit is to send requests from the new instance of the application to the second computing platform.

Example 45 is a server system in accordance with any of Examples 32-44, wherein the host processor comprises a central processing unit (CPU) core.

Example 46 is a server system in accordance with any of Examples 32-44, wherein the host processor comprises a graphics processing unit (GPU) core.

Example 47 is a server system in accordance with any of Examples 32-46, wherein the memory comprises a random access memory (RAM) device.

Example 48 is a server system in accordance with any of Examples 32-46, wherein the memory comprises a cache device.

Example 49 is a server system in accordance with any of Examples 32-48, wherein the memory comprises a multitier memory hierarchy.

Example 50 is a server system in accordance with any of Examples 32-49, wherein the IPU is coupled to the host processor via a peripheral component interconnect express (PCIe) link.

Example 51 is a server system in accordance with any of Examples 32-50, wherein the orchestrator is to instantiate a new instance of an application associated with the migrated data on a second computing platform different from the first computing platform prior to completion of migration of the data.

Example 52 is a server system in accordance with Examples 51, herein the processing core comprises a central processing unit (CPU).

Example 53 is a an apparatus comprising a computer readable storage medium having content stored thereon, which when executed by a computing system, causes the computing system to perform a method for mitigating server failure including: detecting a failure of a processing core of a first computing platform with a processing unit having an interface to the processing core and including an interface to a network external to the processing core; and migrating data from a memory on the first computing platform that stores data for the processing core to a second computing platform in response to detecting the failure.

Example 54 is an apparatus in accordance with Example 53, wherein detecting the failure of the processing core comprises predicting the failure of the processing core.

Example 55 is an apparatus in accordance with either Example 53 or Example 54, herein the processing core comprises a central processing unit (CPU).

Example 56 is an apparatus in accordance with either Example 53 or Example 54, herein the processing core comprises a graphics processing unit (GPU).

Example 57 is an apparatus in accordance with any of Examples 53-56, wherein the memory comprises a random access memory (RAM) device.

Example 58 is an apparatus in accordance with any of Examples 53-56, wherein the memory comprises a cache device.

Example 59 is an apparatus in accordance with any of Examples 53-58, wherein the memory comprises a multitier memory hierarchy.

Example 60 is an apparatus in accordance with any of Examples 53-59, wherein the processing unit comprises an intelligent processing unit coupled to the processing core via a peripheral component interconnect express (PCIe) link.

Example 61 is an apparatus in accordance with any of Examples 53-60, wherein migrating the data to the second computing platform comprises migrating the data to a remote storage platform.

Example 62 is an apparatus in accordance with any of Examples 53-60, wherein migrating the data to the second computing platform comprises migrating the data to a pooled memory platform.

Example 63 is an apparatus in accordance with any of Examples 53-60, wherein the first computing platform comprises a first server node and the second computing platform comprises a second server node.

Example 64 is an apparatus in accordance with any of Examples 53-63, wherein migrating the data to the second computing platform comprises migrating selected critical data from the memory to the second computing platform.

Example 65 is an apparatus in accordance with any of Examples 53-64, wherein the processing unit migrates selected critical data from the memory to the second computing platform.

Example 66 is an apparatus in accordance with any of Examples 53-65, wherein the processing unit migrates a selected address range of the memory to the second computing platform.

Example 67 is an apparatus in accordance with any of Examples 53-66, wherein the data includes cryptographic keys and computational results.

Example 68 is an apparatus in accordance with any of Examples 53-67, wherein the method includes instantiating a new instance of an application associated with the migrated data on a computing platform different from the first computing platform prior to completing migration of the data.

Example 69 is an apparatus in accordance with any of Examples 53-68, wherein the processing unit sends requests from the new instance of the application to the second computing platform.

Example 70 is a method for mitigating server failure including: identifying the data to a processing unit having an interface to the host processor and the memory and having an interface to a network external to the host processor; and offloading processing tasks to the processing unit; wherein the processing unit is to detect a failure of the host processor and migrate the data to a second computing platform in response to detection of the failure.

Example 71 is a method in accordance with Example 70, wherein selecting the data of the memory to protect comprises determining critical data to be migrated in case the host processor fails.

Example 72 is a method in accordance with either Example 70 or Example 71, wherein selecting the data of the memory to protect comprises specifying address ranges to store cryptographic keys and computational results.

Example 73 is a method in accordance with any of Examples 70-72, wherein identifying the data to the processing unit comprises passing address ranges to the processing unit.

Example 74 is a an apparatus comprising a computer readable storage medium having content stored thereon, which when executed by a computing system, causes the computing system to perform a method for mitigating server failure including: selecting data of a memory to protect in event of a failure of a host processor of a first computing platform by a host operating system executing on the host processor; identifying the data to a processing unit having an interface to the host processor and the memory and having an interface to a network external to the host processor; and offloading processing tasks to the processing unit; wherein the processing unit is to detect a failure of the host processor and migrate the data to a second computing platform in response to detection of the failure.

Example 75 is an apparatus in accordance with Example 73, wherein selecting the data of the memory to protect comprises determining critical data to be migrated in case the host processor fails.

Example 76 is an apparatus in accordance with either Example 74 or Example 75, wherein selecting the data of the memory to protect comprises specifying address ranges to store cryptographic keys and computational results.

Example 77 is an apparatus in accordance with any of Examples 73-75, wherein identifying the data to the processing unit comprises passing address ranges to the processing unit.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A server system, comprising:
a processing core of a first computing platform;
a volatile memory on the first computing platform to store data for the processing core; and
a processing unit having access to the volatile memory, the processing unit including an interface to the processing core and the volatile memory and including an interface to a network external to the processing core, the processing core to offload processing tasks to the processing unit while the processing core is available, the processing unit to detect a failure of the processing core that makes the processing core unavailable, and migrate the data from the volatile memory to a second computing platform in response to detection of the failure.

2. The server system of claim 1, wherein the processing core comprises a central processing unit (CPU) or a graphics processing unit (GPU).

3. The server system of claim 1, wherein the volatile memory comprises a random access memory (RAM) device or a cache device.

4. The server system of claim 1, wherein the volatile memory comprises a multitier memory hierarchy.

5. The server system of claim 1, wherein the processing unit comprises an intelligent processing unit coupled to the processing core via a peripheral component interconnect express (PCIe) link.

6. The server system of claim 1, wherein the second computing platform comprises a remote storage platform or a pooled memory platform.

7. The server system of claim 1, wherein the first computing platform comprises a first server node and the second computing platform comprises a second server node.

8. The server system of claim 1, wherein the processing unit is to migrate selected critical data from the volatile memory to the second computing platform.

9. The server system of claim 1, wherein the processing unit is to migrate a selected address range of the volatile memory to the second computing platform.

10. The server system of claim 1, wherein the data includes cryptographic keys and computational results.

11. The server system of claim 1, wherein the processing unit has a different computational domain from the processing core.

12. The server system of claim 11, wherein the processing unit is to continue to operate after the failure of the processing core.

13. An apparatus comprising a computer readable storage medium having content stored thereon, which when executed causes a computing system to perform a method for mitigating server failure including:
selecting data of a volatile memory to protect in event of a failure of a host processor of a first computing platform by a host operating system executing on the host processor;
identifying the data to a processing unit having an interface to the host processor and the volatile memory and having an interface to a network external to the host processor; and
offloading processing tasks to the processing unit;
wherein the processing unit is to detect a failure of the host processor that makes the host processor unavailable and migrate the data from the volatile memory to a second computing platform in response to detection of the failure.

14. The apparatus of claim 13, wherein selecting the data of the volatile memory to protect comprises determining critical data to be migrated in case the host processor fails.

15. The apparatus of claim 13, wherein selecting the data of the volatile memory to protect comprises specifying address ranges to store cryptographic keys and computational results.

16. The apparatus of claim 13, wherein identifying the data to the processing unit comprises passing address ranges to the processing unit.

17. A server system, comprising:
multiple computing platforms having a host processor with a host operating system, a volatile memory to store data for the host processor, and an infrastructure processing unit (IPU) separate from the host processor with a separate operating system, the IPU having access to the volatile memory; and
an orchestrator server node to manage the multiple computing platforms;
wherein the IPU of a first computing platform of the multiple computing platforms capable to detect a failure of the host processor of the first computing platform that makes the host processor unavailable, notify the orchestrator of the failure, and migrate the data out of the volatile memory in response to detection of the failure.

18. The server system of claim 17, wherein the IPU of the first computing platform is to migrate the data to a remote storage platform or to a pooled memory platform or to a second computing platform.

19. The server system of claim 17, wherein the IPU of the first computing platform is to migrate the data to an internal storage of the first computing platform.

20. The server system of claim 17, wherein the IPU is configured to pass to the orchestrator a list of services with process address space identifiers (PASIDs) for the services and memory ranges to migrate from the volatile memory.

21. The server system of claim 17, wherein the orchestrator is to instantiate a new instance of an application associated with the migrated data on a second computing platform different from the first computing platform prior to completion of migration of the data.

22. The server system of claim 21, wherein the IPU is to send requests from the new instance of the application to the second computing platform.

* * * * *